(12) United States Patent
Ayhan et al.

(10) Patent No.: US 12,192,714 B2
(45) Date of Patent: Jan. 7, 2025

(54) DEEP LEARNING SYSTEM FOR REAL TIME MAXIMUM SOUND PRESSURE LEVEL PREDICTION

(71) Applicant: The Boeing Company, Chicago, IL (US)

(72) Inventors: Samet M. Ayhan, Fairfax, VA (US); Mikhail Y. Danilin, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 261 days.

(21) Appl. No.: 17/805,403

(22) Filed: Jun. 3, 2022

(65) Prior Publication Data
US 2023/0396919 A1  Dec. 7, 2023

(51) Int. Cl.
*H04R 3/00* (2006.01)
*G06N 3/045* (2023.01)
*G10K 11/16* (2006.01)

(52) U.S. Cl.
CPC ............ *H04R 3/005* (2013.01); *G06N 3/045* (2023.01); *G10K 11/16* (2013.01)

(58) Field of Classification Search
None
See application file for complete search history.

(56) References Cited

U.S. PATENT DOCUMENTS

| | | | |
|---|---|---|---|
| 8,311,686 B2 | 11/2012 | Herkes et al. | |
| 9,310,204 B2 | 4/2016 | McGregor et al. | |
| 11,244,572 B2 | 2/2022 | Villa et al. | |
| 11,741,755 B2 | 8/2023 | Ko et al. | |
| 11,804,207 B1 | 10/2023 | Salter et al. | |
| 11,900,818 B2 | 2/2024 | Rostamzadeh et al. | |
| 2011/0046818 A1* | 2/2011 | Herkes | G08G 5/0078 701/3 |
| 2020/0388166 A1* | 12/2020 | Rostamzadeh | G06N 5/04 |
| 2021/0034846 A1* | 2/2021 | Ko | G06N 3/082 |

(Continued)

OTHER PUBLICATIONS

US Dep't of Transp. FAA, Aviation Environmental Design Tool, Technical Manual, Version 2a (Jan. 2014).*

(Continued)

*Primary Examiner* — Walter F Briney, III
(74) *Attorney, Agent, or Firm* — Yee & Associates, P.C.

(57) ABSTRACT

A method, apparatus, system, and computer program product for predicting sequential maximum sound pressure levels generated by an aircraft. A first set of sequential maximum sound pressure levels recorded by a first consecutive set of the microphones along a flight path during a flight of the aircraft using the flight path is identified. A second set of sequential maximum sound pressure levels that will be recorded by a second consecutive set of the microphones along the flight path during the flight of the aircraft using the flight path over the location is predicted. Predicting the second set of sequential maximum sound pressure levels using the set of deep learning models after training the set of deep learning models using a training dataset comprising historical aircraft sensor data for selected parameters, historical atmospheric data, and historical sound data recorded by microphones in a microphone system for flight paths over the location.

26 Claims, 20 Drawing Sheets

(56) References Cited

U.S. PATENT DOCUMENTS

2022/0114506 A1* 4/2022 Villa ...................... G06Q 10/20
2023/0351996 A1* 11/2023 Salter ................. G10K 11/1754

OTHER PUBLICATIONS

George Ho, Autoregressive Models in Deep Learning—A Brief Survey (https://www.georgeho.org/deep-autoregressive-models/) (last accessed May 1, 2024) (Mar. 9, 2019).*

Thomas Wood, What is Backpropagation? (https://web.archive.org/web/20210901211049/ https://deepai.org/machine-learning-glossary-and-terms/backpropagation) (last accessed May 3, 2024) (Sep. 12, 2021).*

Lee et al., Aviation Environmental Design Tool (AEDT): Technical Manual, Version 3b, Volpe National Transportation System Center, Sep. 6, 2019, 468 pages.

Lopes et al., "Design of the Next Generation Aircraft Noise Prediction Program: ANOPP2," 17th AIAA/CEAS Aeroacoustics Conference (32nd AIAA Aeroacoustics Conference), Jun. 2011, 17 pages.

Ayhan et al., "Machine Learning System For Maximum Sound Pressure Level Prediction," U.S. Appl. No. 17/805,371, filed Jun. 3, 2022, 79 pages.

Ayhan et al., "Machine Learning System For Sound Exposure Level Prediction," U.S. Appl. No. 17/805,389, filed Jun. 3, 2022, 87 pages.

Office Action dated May 13, 2024, regarding U.S. Appl. No. 17/805,371, 22 pages.

Notice of Allowance dated Aug. 14, 2024, regarding U.S. Appl. No. 17/805,371, 10 pages.

* cited by examiner

DEEP LEARNING SYSTEM FOR REAL TIME MAXIMUM SOUND PRESSURE LEVEL PREDICTION

CROSS-REFERENCE TO RELATED APPLICATIONS

This application is related to the following patent applications entitled "MACHINE LEARNING SYSTEM FOR MAXIMUM SOUND PRESSURE LEVEL PREDICTION", Ser. No. 17/805,371, filed Jun. 3, 2022 and assigned US Patent Publication No. US 2023-0394978-A1 dated Dec. 7, 2023; and "MACHINE LEARNING SYSTEM FOR SOUND EXPOSURE LEVEL PREDICTION", Ser. No. 17/805,389, filed Jun. 3, 2022 and assigned US Patent Publication No. US 2023-0394977-A1 dated Dec. 7, 2023 and assigned to the same assignee. The aforementioned applications are incorporated herein by reference in their entirety.

BACKGROUND INFORMATION

1. Field

The present disclosure relates generally to managing aircraft noise and in particular, to a method and system to predict maximum sound pressure levels in real time for aircraft arrivals and departures.

2. Background

Aircraft arriving at airports and aircraft departing from airports produce noise levels that can disturb communities surrounding the airport. Significant decreases have been made in the noise caused by aircraft in the past few decades. However, improvements and navigation techniques have resulted in aircraft overflowing some communities with increased frequency. This change has resulted in complaints from communities at locations on departure and arrival flight tracks.

In response to these complaints, many countries have enacted regulations to control aircraft noise. For example, the Federal Aviation Administration (FAA) regulates the maximum amount of noise that an individual civil aircraft can produce during takeoff and landing and near airports. Air navigation service providers (ANSPs) across the world are making efforts to enforce noise-reduced arrival and departure procedures and penalizing airlines for their flights that produce noise above mandated thresholds.

The measurement of noise can be made in a number of different ways. For example, maximum sound pressure level (LAmax) is measurement of a maximum sound pressure level reached during the measurement time period that is expressed in dBA. In these examples, maximum sound pressure level (LAmax) is the highest time weighted sound pressure level.

This type of noise can be measured by microphones located at the airport for arrivals and departures. With the maximum sound pressure level, during the time of an aircraft overflight, the measurement of noise can start at background levels and rise to the maximum level as aircraft flies closer to the microphone on the ground and returns to background level as the aircraft moves into the distance.

Regulations can specify noise reduced arrival and departure procedures along with thresholds for the maximum sound pressure level. Airlines can be penalized for the arrival and departure of flights at airports that produce noise above the specified thresholds for the maximum sound pressure level.

SUMMARY

An embodiment of the present disclosure provides a method for predicting sequential maximum sound pressure levels generated by an aircraft. A first set of sequential maximum sound pressure levels recorded by a first consecutive set of the microphones along a flight path during a flight of the aircraft using the flight path is identified. A second set of sequential maximum sound pressure levels that will be recorded by a second consecutive set of the microphones along the flight path during the flight of the aircraft using the flight path over the location is predicted. The second set of sequential maximum sound pressure levels is predicted using the set of deep learning models after training the set of deep learning models using a training dataset comprising historical aircraft sensor data for selected parameters, historical atmospheric data, and historical sound data recorded by microphones in a microphone system for flight paths over the location.

Another embodiment of the present disclosure provides a method for predicting sequential maximum sound pressure levels generated by an aircraft. A first set of sequential maximum sound pressure levels recorded by a first consecutive set of the microphones along a flight path during a flight of the aircraft using the flight path is identified. A second set of sequential maximum sound pressure levels that will be recorded by a second consecutive set of the microphones along the flight path during the flight of the aircraft using the flight path over the location is predicted. The second set of sequential maximum sound pressure levels is predicted using the set of deep learning models after training the set of deep learning models using a training dataset comprising historical aircraft sensor data for selected parameters, historical atmospheric data, and historical sound data recorded by microphones in a microphone system for flight paths over the location.

Yet another embodiment of the present disclosure provides a deep learning system for sequential sound pressure level prediction comprising a computer system; and a controller in the computer system. The controller is configured to train a set of deep learning models to predict the sequential maximum sound pressure levels generated by the aircraft for a flight path over a location using a training dataset comprising historical aircraft sensor data for selected parameters, historical atmospheric data, and historical sound data recorded by microphones in a microphone system for flight paths over the location. The controller is configured to identify a first set of the sequential maximum sound pressure levels recorded by a first consecutive set of the microphones along the flight path during a flight of the aircraft using the flight path. The controller is configured to predict a second set of the sequential maximum sound pressure levels that will be recorded by a second consecutive set of the microphones along the flight path by the during the flight of the aircraft using the flight path over the location, wherein the second set of the sequential maximum sound pressure levels is predicted using the set of deep learning models after training the set of deep learning models using the training dataset.

Still another embodiment of the present disclosure provides a computer program product for predicting sequential maximum sound pressure levels. The computer program product comprises a computer readable storage medium having program instructions embodied therewith. The program instructions are executable by a computer system to cause the computer system to perform a method of training a set of deep learning models to predict the sequential maximum sound pressure levels generated by the aircraft for a flight path over a location using a training dataset comprising historical aircraft sensor data for selected parameters, historical atmospheric data, and historical sound data recorded by microphones in a microphone system for flight paths over the location; recording a first set of the sequential maximum sound pressure levels recorded by a first consecutive set of the microphones along the flight path during a flight of the aircraft using the flight path; and predicting a second set of the sequential maximum sound pressure levels that will be recorded by a second consecutive set of the microphones along the flight path the during the flight of the aircraft using the flight path over the location, wherein the second set of the sequential maximum sound pressure levels is predicted using the set of deep learning models after training the set of deep learning models using the training dataset.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Figure 1:
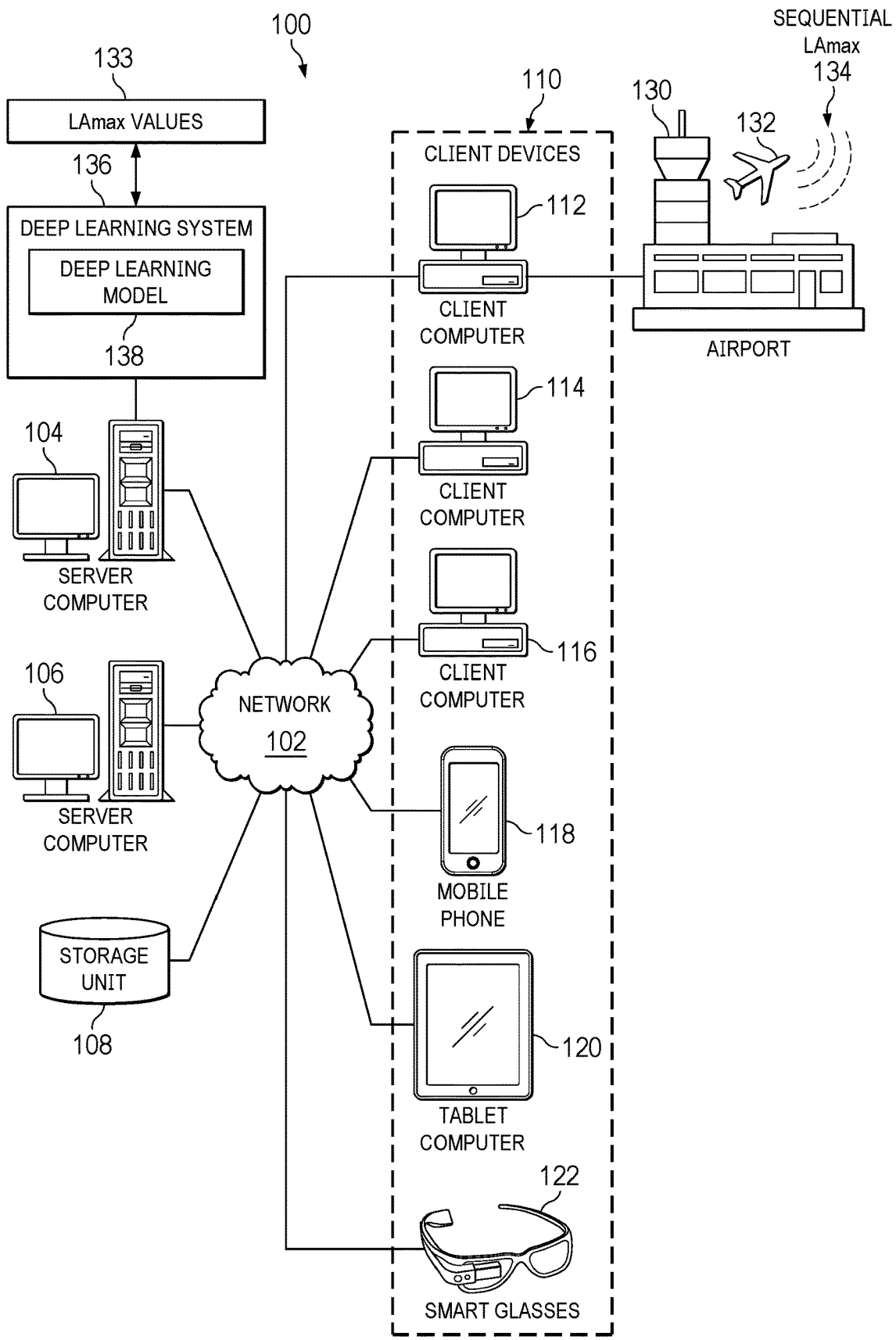
FIG. 1 is a pictorial representation of a network of data processing systems in which illustrative embodiments can be implemented.

The illustrative embodiments recognize and take into account one or more different considerations as described herein. For airlines to comply with these requirements, airlines need to be able to accurately predict noise for their arriving and departing flights. Additionally, air navigation service providers need be able to accurately predict noise for flights so that the air navigation service providers can generate noise-reduced arrival and departure procedures and enforce noise mitigated arrivals and departures.

Being able to accurately predict the maximum sound pressure level for an arriving or departing flight in the vicinity of airport can be used to improve the impact of aircraft noise on the environment for locations around the airport. Further, with ability to predict maximum sound pressure levels (LAmax) for arriving and departing flights, airlines can plan and use flight paths that have maximum sound pressure levels that are lower to avoid penalties imposed by air navigation service providers. Further, with the ability to accurately predict maximum sound pressure levels, air navigation service providers can generate noise reduced arrival and departure procedures.

Currently, various approaches are present for predicting noise for flights. One approach is the FAA Aviation Environmental Design Tool (AEDT). This tool uses the noise-power distance (NPD) curves that provide noise levels measured at various distances from a particular aircraft and engine configuration for different thrust settings and operational modes.

Although this approach is relatively numerically efficient and consistent with noise certification values, this approach cannot capture noise propagation effects for different weather conditions and aircraft configurations. As a result, the accuracy of AEDT is not as great as desired.

Another approach is a semi-empirical, physics-based approximation model employed by the NASA Aircraft Noise Prediction Program (ANOPP). This model computes noise levels from the airframe and engine components at a user-defined three-dimensional observer grid for an arbitrary flight procedure. This model can be continuously updated with historical noise data and applies parametric and component models to separately simulate each relevant noise source.

Although this approach is relatively accurate, it is time consuming and computer-intensive. This approach also suffers from lack of robust validation for each relevant noise source and several simplifications. For example, wind was ignored. ANOPP is a semi-empirical and physics-based system in which human operators formulate the solution using only several parameters for a limited number of cases.

Thus, illustrative examples employ deep learning models in the form of deep learning models that are unbiased and can utilize large amounts of data. These machines learning models can also consider all regular and irregular edge cases formulating a solution with as many parameters that are available. The illustrative examples provide a more accurate and efficient manner to predict maximum sound pressure levels through the use of deep learning models as compared to current techniques for predicting maximum sound pressure levels. This prediction can be performed in real time as an aircraft flies on a flight path over a location such as an airport. With this increased accuracy in predicting maximum sound pressure levels using deep learning models, adjustments or changes to the flight paths of aircraft can be made to reduce or avoid generating maximum sound pressure levels that are greater than specified thresholds for the flight path over the airport or areas surrounding the airport.

With reference now to the figures and, in particular, with reference to FIG. 1, a pictorial representation of a network of data processing systems is depicted in which illustrative embodiments can be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client devices 110 connect to network 102. As depicted, client devices 110 include client computer 112, client computer 114, and client computer 116. Client devices 110 can be, for example, computers, workstations, or network computers. In the depicted example, server computer 104 provides information, such as boot files, operating system images, and applications to client devices 110. Further, client devices 110 can also include other types of client devices such as mobile phone 118, tablet computer 120, and smart glasses 122. In this illustrative example, server computer 104, server computer 106, storage unit 108, and client devices 110 are network devices that connect to network 102 in which network 102 is the communications media for these network devices. Some or all of client devices 110 may form an Internet of things (IoT) in which these physical devices can connect to network 102 and exchange information with each other over network 102.

Client devices 110 are clients to server computer 104 in this example. Network data processing system 100 may include additional server computers, client computers, and other devices not shown. Client devices 110 connect to network 102 utilizing at least one of wired, optical fiber, or wireless connections.

Program instructions located in network data processing system 100 can be stored on a computer-recordable storage media and downloaded to a data processing system or other device for use. For example, program instructions can be stored on a computer-recordable storage media on server computer 104 and downloaded to client devices 110 over network 102 for use on client devices 110.

In the depicted example, network data processing system 100 is the Internet with network 102 representing a world-wide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented using a number of different types of networks. For example, network 102 can be comprised of at least one of the Internet, an intranet, a local area network (LAN), a metropolitan area network (MAN), or a wide area network (WAN). FIG. 1 is intended as an example, and not as an architectural limitation for the different illustrative embodiments.

As used herein, "a number of" when used with reference to items, means one or more items. For example, "a number of different types of networks" is one or more different types of networks.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

This illustrative example, client computer 112 is a client device in client devices 110 located at or in communication with airport 130. As depicted, commercial airplane 132 can arrive and takeoff from airport 130. Commercial airplane 132 generates noise that can be measured using as sequential LAmax 134. In the illustrative example, sequential LAmax 134 is sequence of maximum sound pressure levels that commercial airplane 132 generates during flight over airport 130. This flight can be for an arriving flight or a departing flight from airport 130 in this illustrative example.

In this illustrative example, deep learning system 136 comprises deep learning model 138 that operates to predict sequential LAmax 134 in real time as commercial airplane 132 flies over airport 130 when arriving or taking off. For example, deep learning model 138 can predict a sequence of LAmax values 133 for sequential LAmax 134 for a flight path being flown by commercial airplane 132.

For example, with a recorded sequence of LAmax values 133 for sequential LAmax 134 for the portion of the flight path that commercial airplane 132 has already flown, deep learning model 138 in deep learning system 136 can predict a sequence of LAmax values for sequential LAmax 134 that is predicted to occur when commercial airplane 132 flies on an unflown portion of the flight path of commercial airplane 132. In other words, deep learning system 136 can predict sequential LAmax 134 for the unflown portion of the flight path for commercial airplane 132 using sequential LAmax 134 that has been recorded for the flown portion of the flight path in real time as the flight of commercial airplane 132 occurs.

In this illustrative example, deep learning model 138 has been trained to predict noise in the form of a sequence of LAmax values using a training dataset that includes historical aircraft sensor data, historical atmospheric data, and historical sound data.

Figure 2:
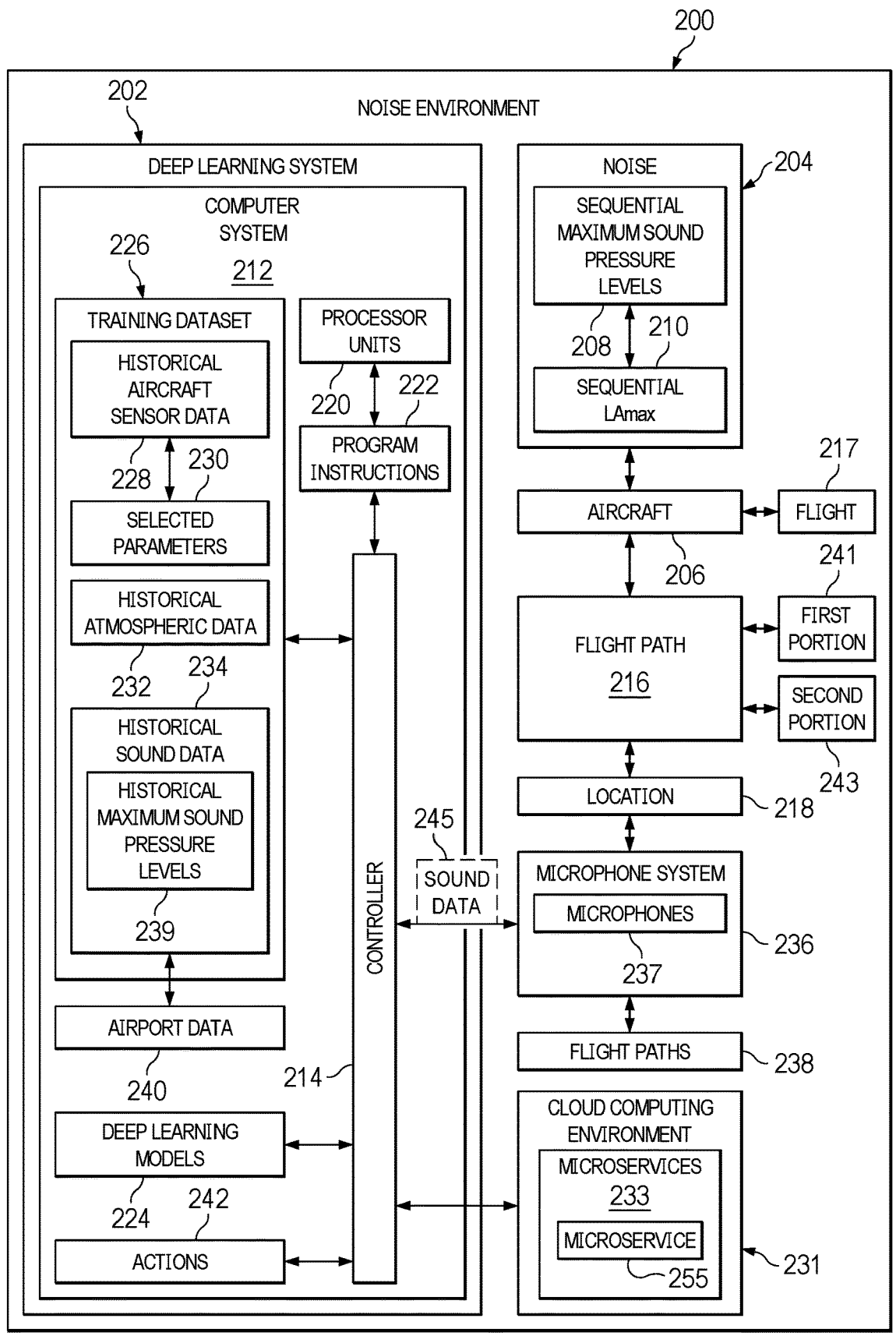
FIG. 2 is a block diagram of a noise environment in accordance with an illustrative embodiment.

With reference now to FIG. 2, a block diagram of a noise environment is depicted in accordance with an illustrative embodiment. In this illustrative example, noise environment 200 includes components that can be implemented in hardware such as the hardware shown in network data processing system 100 in FIG. 1.

In this illustrative example, deep learning system 202 in noise environment 200 can operate to predict noise 204 for aircraft 206. In this illustrative example, the prediction of noise 204 is a prediction of sequential maximum sound pressure levels 208 generated by aircraft 206. In this example, sequential maximum sound pressure levels 208 can be referred to as sequential LAmax 210. Sequential maximum sound pressure levels 208 can be a maximum A-weighted sound pressure levels in which the A weighting adjusts sound pressure reading levels to reflect the sensitivity of the human ear.

Aircraft 206 can take a number of different forms. For example, aircraft 206 can be a commercial airplane, a tilt-rotor aircraft, a tilt wing aircraft, a vertical takeoff and landing aircraft, an electrical vertical takeoff and landing vehicle, a personal air vehicle, and other types of aircraft 206.

In this illustrative example, deep learning system 136 comprises computer system 212 and controller 214. Controller 214 is located in computer system 212. In this illustrative example, controller 214 can operate as a maximum sound pressure level predictor to predict sequential maximum sound pressure levels 208 generated by generated by aircraft 206 for flight path 216 over location 218. In this illustrative example, flight path 216 can be for an arrival or departure of aircraft 206. Location 218 is an airport in this example but can be any area where a prediction of sequential maximum sound pressure levels 208 is of interest. As another example, location 218 can be an area adjacent to or near an airport.

Controller 214 can be implemented in software, hardware, firmware, or a combination thereof. When software is used, the operations performed by controller 214 can be implemented in program code configured to run on hardware, such as a processor unit. When firmware is used, the operations performed by controller 214 can be implemented in program code and data and stored in persistent memory to run on a processor unit. When hardware is employed, the hardware can include circuits that operate to perform the operations in controller 214.

In the illustrative examples, the hardware can take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

Computer system 212 is a physical hardware system and includes one or more data processing systems. When more than one data processing system is present in computer system 212, those data processing systems are in communication with each other using a communications medium. The communications medium can be a network. The data processing systems can be selected from at least one of a computer, a server computer, a tablet computer, or some other suitable data processing system.

As depicted, computer system 212 includes a number of processor units 220 that are capable of executing program instructions 222 implementing processes in the illustrative examples. As used herein a processor unit in the number of processor units 220 is a hardware device and is comprised of hardware circuits such as those on an integrated circuit that respond and process instructions and program code that operate a computer. When a number of processor units 220 execute program instructions 222 for a process, the number of processor units 220 is one or more processor units that can be on the same computer or on different computers. In other words, the process can be distributed between processor units on the same or different computers in a computer system. Further, the number of processor units 220 can be of the same type or different type of processor units. For example, a number of processor units can be selected from at least one of a single core processor, a dual-core processor, a multi-processor core, a general-purpose central processing unit (CPU), a graphics processing unit (GPU), a digital signal processor (DSP), or some other type of processor unit.

In this illustrative example, controller 214 trains a set of deep learning models 224 in the form of a set of deep learning models 224 to predict sequential maximum sound pressure levels 208 generated by aircraft 206 for flight path 216 during flight 217 of aircraft 206 over location 218 using a training dataset 226. In this depicted example, flight path 216 is being flown by aircraft 206 when the set of deep learning models 224 makes predictions of sequential maximum sound pressure levels 208.

In this illustrative example, training dataset 226 comprises historical aircraft sensor data 228 for selected parameters 230, historical atmospheric data 232, and historical sound data 234 recorded by microphone system 236 for flight paths 238 over location 218. Historical aircraft sensor data 228 for selected parameters 230, historical atmospheric data 232, and historical sound data 234 recorded by microphone system 236 for flight paths 238 can be for at least one of an aircraft type, a tail number, or an airline. In other words, training dataset 226 can have levels of granularity with respect to predictions of sequential maximum sound pressure levels 208. In other words, the historical data in training dataset 226 can be obtained using a number of different aircraft Historical aircraft sensor data 228 is sensor generated data from various aircraft flying flight paths 238 over location 218. The various aircraft that generate historical aircraft sensor data 228 can include aircraft 206 or other aircraft. Historical atmospheric data 232 can include temperature, humidity, pressure, wind, and other weather conditions. Historical atmospheric data 232 can include information for different altitudes.

In this illustrative example, historical sound data 234 comprises sound data recorded for flight paths 238. This sound data can be, for example, historical maximum sound pressure levels 239. Historical sound data 234 can also include metadata about the sound recorded. For example, the metadata can include slant distances, microphone configuration, timestamps, microphone locations, and other suitable information. Microphone system 236 comprises microphones 237 at different positions in or near location 218. These microphones can record sound in location 218. For example, microphones 237 can be located along a runway, a flight path, or other positions and location 218. In this example, microphones 237 can be located along flight paths 238 and record sound generated by different aircraft flying on flight paths 238.

In this illustrative example, all of the historical data in training dataset 226 is correlated to times for when flight paths 238 are already flown flight paths for one or more aircraft. Historical sound data 234 can be part of airport data 240. Further, airport data 240 can include other information for training dataset 226. For example, airport data 240 can include information about aircraft altitude, location, and other information that can be used to determine flight paths 238. As a result, flight paths 238 can be obtained from airport data 240 in addition to or in place of using historical aircraft sensor data 228.

As depicted, controller 214 can predict sequential maximum sound pressure levels 208 generated by aircraft 206 for flight 217 of aircraft 206 using flight path 216 over location 218 using the set of deep learning models 224 after training the set of deep learning models 224 using training dataset 226. The prediction of sequential maximum sound pressure levels 208 generated by aircraft 206 for flight 217 of aircraft 206 using flight path 216 over location 218 can be performed using the set of deep learning models 224. This prediction is performed in real time in the illustrative examples.

In other words, the prediction is made while aircraft 206 is flying using flight path 216. Further, this prediction can be made in a timely manner for performing actions 242 such as to control or change flight path 216 such that the maximum sequential pressure levels predicted can change to be within thresholds required for location 218.

For example, controller 214 identifies a first set of the sequential maximum sound pressure levels 208 recorded by a first consecutive set of the microphones 237 along flight path 216 during flight 217 of aircraft 206 using flight path 216. The first set of the sequential maximum sound pressure levels 208 recorded by a first consecutive set of the microphones 237 can be received in sound data 245 from microphone system 236. Sound data 245 can be part of airport data.

Controller 214 can predict a second set of the sequential maximum sound pressure levels 208 that will be recorded by a second consecutive set of the microphones 237 along flight path 216 during flight 217 of aircraft 206 using flight path 216 over location 218. In this example, the second set of the sequential maximum sound pressure levels 208 is predicted using the set of deep learning models 224 after training the set of deep learning models 224 using the training dataset.

In this depicted example, a first consecutive set of the microphones 237 in microphone system 236 records the first set of the sequential maximum sound pressure levels 208 from when aircraft 206 flew on first portion 241 of flight path 216. This first set of the sequential maximum sound pressure levels 208 is used as an input into the set of deep learning models 224. In this example, the set of deep learning models 224 is a single deep learning model.

In response, the set of deep learning models 224 generates an output in the form of a prediction of the second set of the sequential maximum sound pressure levels 208 that will be recorded by a second consecutive set of the microphones 237 along the flight path 216. In this depicted example, the second set of the sequential maximum sound pressure levels 208 is for second portion 243 of flight path 216 that has not yet been flown by aircraft 206.

In other words, first portion 241 has already been flown by aircraft 206 while second portion 243 is has yet to be flown by aircraft 206. In this manner, a real time prediction of the second set of the sequential maximum sound pressure levels 208 can be made based on the first set of the sequential maximum sound pressure levels 208 already generated by aircraft 206 and recorded by first consecutive set of the microphones 237.

Further, in this example the first consecutive set of the microphones 237 comprises a series of microphones 237 along first portion 241 of flight path 216 without a gap in microphones 237 or skipping a microphone in microphones 237. In similar fashion, the second consecutive set of the microphones 237 is also a series of microphones 237 along second portion 243 of flight path 216 without a gap or skipping a microphone in microphones 237.

In this illustrative example, based on predicting sequential maximum sound pressure levels 208, controller 214 can perform a set of actions 242. The set of actions 242 can include at least one of planning flight path 216 over location 218 using the prediction of the sequential maximum sound pressure levels 208 generated by aircraft 206 for flight path 216 over location 218, determining compliance with a regulation regarding sequential maximum sound pressure levels 208 for this flight over location 218, changing second portion 243 of flight path 216, identifying changes to aircraft configuration for aircraft 206 for flying second portion 243 of flight path 216, or other suitable actions.

These actions can be used to reduce noise 204 generated by aircraft 206 in real time while aircraft 206 flies over location 218 using flight path 216. For example, actions 242 can include changing at least one of a thrust level, control surface position, a flap position, a spoiler position, or some configuration for aircraft 206. In another example the actions 242 can include changing one or more waypoints for flight path 216 being flown by aircraft 206. Further, the set of actions 242 can be used for other purposes in addition to or in place of controlling flight path 216 during flight 217 of aircraft 206.

For example, the set of actions 242 can be used by aviation authorities and airlines to plan or replan individual flight paths. As another example, the set of actions 242 can be used by aviation authorities and airlines to plan or replan cumulative flight paths. This replanning can be for both arrival and departure of flights and made in a manner to reduce noise 204 for location 218 and surrounding locations. In this manner, concerns with noise pollution can be reduced using predictions of sequential maximum sound pressure levels 208 made by the set of deep learning models 224.

Figure 3:
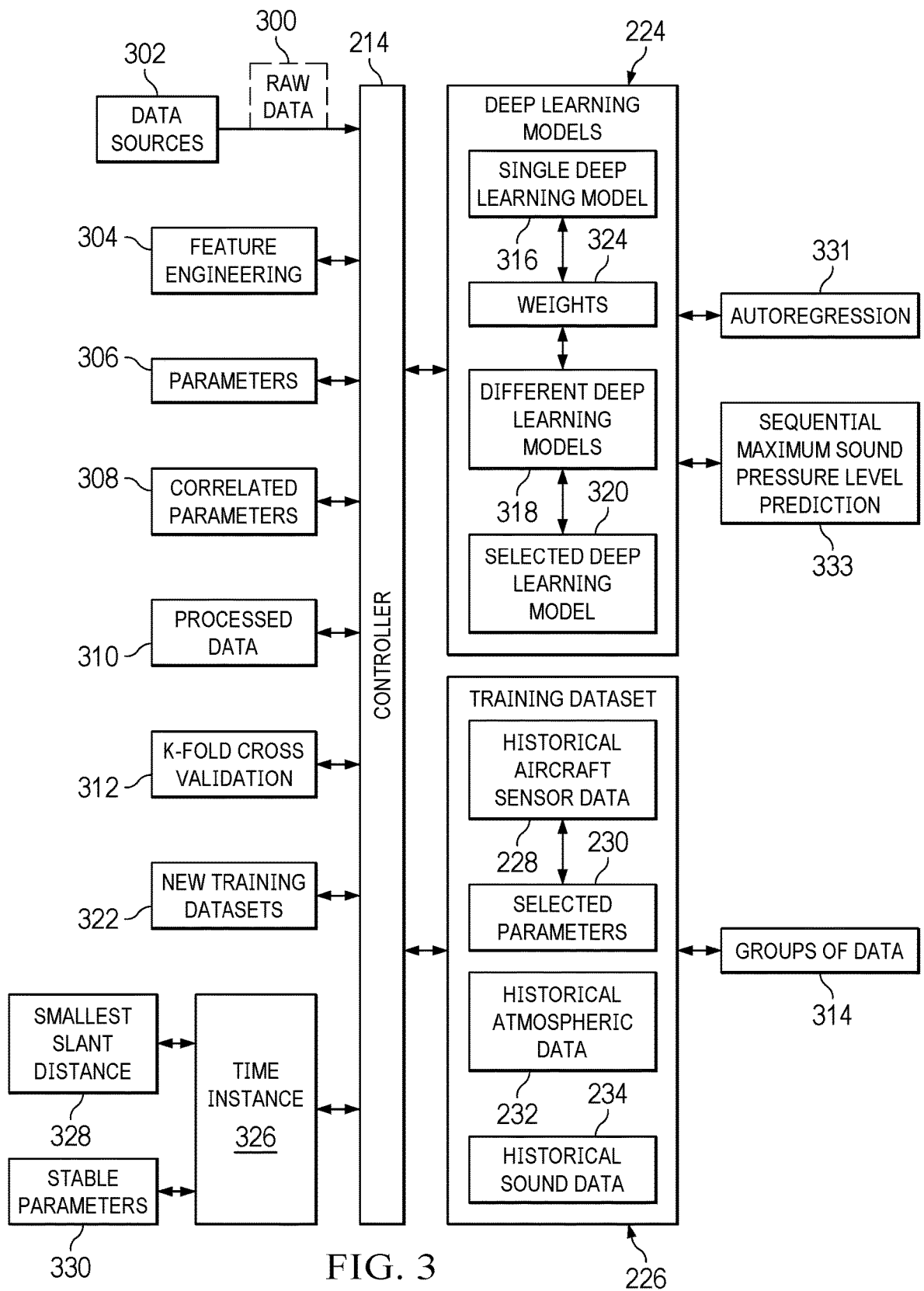
FIG. 3 is an illustration of a block diagram for training deep learning models in accordance with an illustrative embodiment.

Turning next to FIG. 3, an illustration of a block diagram for training deep learning models is depicted in accordance with an illustrative embodiment. In this illustrative example, controller 214 receives raw data 300 from data sources 302 for processing to create training dataset 226.

Raw data 300 can be large in volume, noisy, and incomplete. This raw data is historical data that can include continuous parameter logging (CPL) data, ERA5 (ECMWF Re-Analysis version 5) weather data, airport data, and other suitable types of data. In this example, continuous parameter logging data is an example of historical aircraft sensor data 228 in FIG. 2.

In this example, ERA5 ECMWF Re-Analysis version 5) weather data is an example of historical atmospheric data 232. ERA5 weather data can include vertical profiles of temperature, wind, humidity with timestamps. ERA5 is available from European Centre for Medium-Range Weather Forecasts (ECMWF), which is an independent intergovernmental organization.

Airport data in raw data 300 is an example of data that can include historical sound data 234. This historical sound data 234 is ground truth and can include sequential maximum sound pressure levels 208 for microphone locations, slant distances, and aircraft altitudes. Sequential maximum sound pressure levels 208 can be referred to as sequential LAmax 210.

In processing raw data 300, controller 214 can perform feature engineering 304. In this illustrative example, feature engineering 304 can include at least one of selecting relevant features, handling missing data, computing additional parameters, normalizing data, standardizing data, performing dimensionality reduction, or other suitable processing of the raw data. For example, controller 214 can compute additional parameters, such as thrust for left and right engines, atmospheric absorption along the flight path at 251 Hz, 398 Hz, and 631 Hz frequencies, day of week, and week of month, and impute values for missing parameters such as aircraft weight, fuel flow for left and right engines, runway code, and registration.

These different operations can be performed in feature engineering 304 to select salient features for use as selected parameters 230 for which data is included in training dataset 226. In performing feature engineering, controller 214 can select parameters from parameters 306 identified in raw data 300. The selection of these parameters are correlated parameters 308 that have a correlation to sequential maximum sound pressure levels 208 to form correlated parameters 308.

Further, parameters 306 can be removed from correlated parameters 308 that are repetitive to form selected parameters 230. Repetitive parameters can be filtered out using techniques such as correlation selection and mutual information. A final selection of salient features to form selected parameters 230 can be made using a dimensionality reduction algorithm such as Principal Component Analysis (PCA).

In this illustrative example, raw data 300 processed using feature engineering 304 forms processed data 310. Processed data 310 can be stored in a data structure such as one or more tables.

With timeseries data in processed data 310, each time step is a row and each sensor reading for a parameter is a column in the table. For example, each row can be for a particular time step in which the columns are values for selected parameters 230.

Each table can be for a particular flight using the flight path for a particular microphone. For example, a table can be for departure or arrival using a flight path. In the illustrative example, a time step that best represents sequential maximum sound pressure levels 208 can be selected for a particular microphone.

In generating processed data 310, controller 214 can select time instance 326 where smallest slant distance 328 is present between an aircraft and a microphone in which all of selected parameters 230 for time instance are stable parameters 330. In this example, selected parameters 230 are stable parameters 330 when a moving average of each selected parameter in selected parameters 230 are within a threshold.

In illustrative example, selected parameters 230 are examined to identify stable parameters 330 and not all of the parameters from which selected parameters 230 were identified. Selected parameters 230 are correlated such that these parameters change over time as sequential maximum sound pressure levels 208 changes. Other parameters not identified as selected parameters 230 are excluded. These other parameters do not change or change regardless of changes to sequential maximum sound pressure levels 208. For example, parameters such as date, time, or other similar parameters are not selected parameters 230 and are not considered.

When smallest slant distance 328 is found for a microphone, the selected parameters 230 for that time instance is added to training dataset 226.

This selection can be repeated for each microphone in microphone system 236 for which historical sound data 234 is present. The selection can be performed using heuristics searching for the best matching instance where the slant distance microphone to the aircraft is below the threshold and selected parameters 230 remain stable. In this illustrative example, the maximum sound pressure level measured at the selected time instance is a label for selected parameters 230 for that time instance.

In this example, processed data 310 can be split or divided for use in evaluating quality of the set of deep learning models 224. For example, k-fold cross validation 312 can be performed to divide up processed data for use. With k-fold cross validation 312 processed data 310 is split into k parts. k−1 part of the data is used for training and the remaining 1 part is used for validation and testing in a rotating manner.

In this illustrative example, training dataset 226 can be comprised of groups of data 314. Each group of data in the groups of data 314 is for a flight using a flight path in the flights using flight paths 238 and includes historical aircraft sensor data for selected parameters 230, historical atmospheric data 232, and historical sound data 234 recorded by a microphone system corresponding to time instances for sequential maximum sound pressure levels 208 for the flight.

The set of deep learning models 224 can be single deep learning model 316. In another example, the set of deep learning models 224 can be different deep learning models 318.

Further, before, during or after training, weights 324 can be adjusted for different deep learning models 318. In a deep learning model in deep learning models 224, each selected parameter in selected parameters 230 in the deep learning model is assigned a different weight from other parameters in selected parameters 230 in the deep learning model in deep learning models 224. In this example, different weights for parameters 230 can be selected initially by how one weight is more advantageous than the other weight. The selection can be performed to best fit the model to the problem so that the error is minimum, which is a difference between the actual and the predicted value.

In this illustrative example, the set of deep learning models 224 can use autoregression 331 when predictions of maximum sound pressure level are made sequentially to result in sequential maximum sound pressure level prediction 333. With this type of prediction, the set of deep learning models 224 solve multi-step time series forecasting problem. In other words, the set of deep learning models 224 are trained such that m*maximum sound pressure level recorded along the flight path 216 by subsequent n*microphones is some function of observations at prior time steps.

In this example, the training using training dataset 226 is performed using unsupervised learning. In other words, the set of deep learning models 224 can discover patterns or data groupings in training dataset 226 without human intervention. For example, the set of deep learning models 224 learn from historical data and map independent variables in: historical aircraft sensor data 228, historical atmospheric data 232, historical sound data 234, and airport data 240 to a dependent variable, maximum sound pressure level. These data points can each be mapped to the dependent variable. In other examples, labels can be added to training dataset when supervised learning is used.

In this illustrative example, the training is performed for each deep learning model in different deep learning models 318. Each deep learning model is trained using the same training dataset, training dataset 226. With this type of training, different deep learning models 318 can compete with each other to find the best deep learning model.

In other words, controller 214 can identify a deep learning model from different deep learning models 318 having a highest level of accuracy in predicting the maximum sound pressure levels. A deep learning model having the highest level of accuracy is selected deep learning model 320 and used to predict sequential maximum sound pressure levels 208 for flight path 216 of aircraft 206 over location 218.

The selection of selected deep learning model 320 can be made in any number of different ways. For example, the resulting mean error and standard deviation can be determined for each of different deep learning models 318 to select the top ranking model as selected deep learning model 320.

In the illustrative example, this training can be repeated periodically. In some cases, the training can be performed continuously as new raw data is received from data sources 302. For example, new training datasets 322 can be generated from new aircraft sensor data for selected parameters 230, new atmospheric data, and new sound data recorded by the microphone system 236 in raw data 300.

With new training datasets 322, training of different deep learning models 318 can be repeated. Further, identifying the deep learning model having the highest level of accuracy in predicting the maximum sound pressure levels can be performed in response to continuing to train different deep learning models 318. As a result, selected deep learning model 320 can change over time as different deep learning models 318 are continued to be trained using new training datasets 322.

Figure 4:
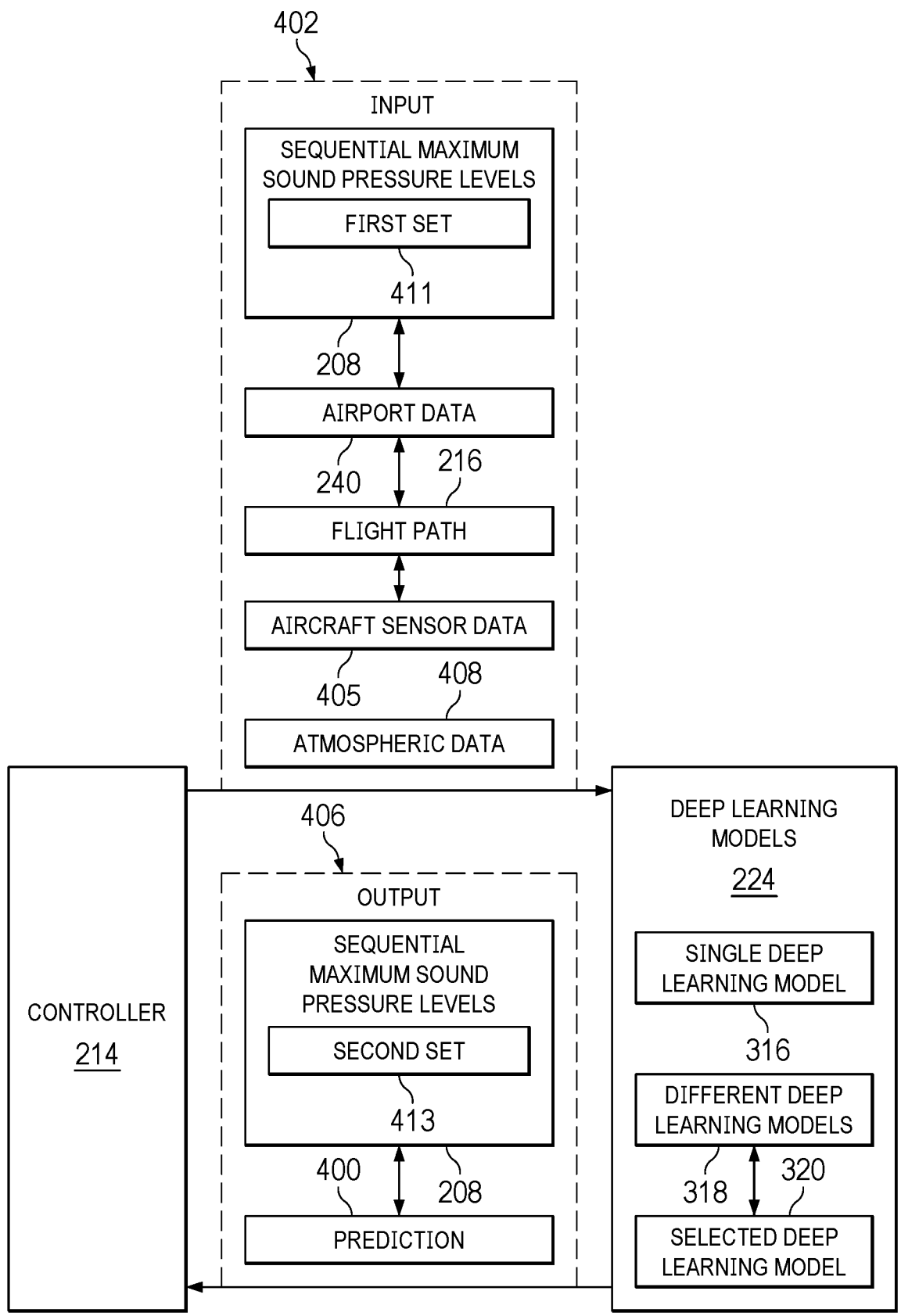
FIG. 4 is an illustration of a block diagram for predicting a maximum sound pressure level for a flight path of an aircraft in accordance with an illustrative embodiment.

With reference next to FIG. 4, an illustration of a block diagram for predicting a maximum sound pressure level for a flight path of an aircraft is depicted in accordance with an illustrative embodiment. In this illustrative example, controller 214 can use the set of deep learning models to generate prediction 400 of sequential maximum sound pressure levels 208 for flight path 216 of aircraft 206 over location 218.

In this illustrative example, controller 214 sends input 402 into the set of deep learning models 224 and in particular to selected deep learning model 320. In response, the set of deep learning models 224 generates output 406 containing prediction 400.

Input 402 is expected to be the same type of data in training dataset 226 without labels such as maximum sound pressure levels. In this illustrative example, input 402 comprises aircraft sensor data 405 for selected parameters 230, atmospheric data 408, and flight path 216. Flight path 216 is path that aircraft 206 is using. Flight path 216 can be derived from airport data 240 or can be input as expected waypoints in aircraft sensor data 405.

In this example, input 402 includes first set 411 of sequential maximum sound pressure levels 208 recorded by a first consecutive set of the microphones along the flight path 216 already flown by aircraft 206 using the flight path. This sound data can be received in airport data 240.

At least one of aircraft sensor data 405, airport data 240, or atmospheric data 408 can be obtained for input 402 in real time. In this manner, predictions can be made for second set 413 of sequential maximum sound pressure levels 208 that will be recorded by a second consecutive set of the microphones 237 along flight path 216 during flight 217 of aircraft 206 using flight path 216.

In this example, time series forecasting is performed by the set of deep learning models 224 in which first set 411 of sequential maximum sound pressure levels 208 recorded by the first consecutive set of the microphones 237 is for a portion of flight path 216 already flown by aircraft 206. First set 411 of sequential maximum sound pressure levels 208 is a function of prior sequential time steps.

This input is sent into the set of deep learning models 224 and results in output 406 with prediction 400. Prediction 400 contains second set 413 of sequential maximum sound pressure levels 208 as a function of subsequent sequential time steps for the portion of flight path 216 that has not yet been flown by aircraft 206 during the same flight.

In the illustrative examples, prediction 400 is generated in real time as aircraft 206 flies on flight path 216 to predict sequential maximum sound pressure levels 208 that will be recorded on flight path 216 based on sequential maximum sound pressure levels 208 already recorded on flight path 216.

In this illustrative example, real time means the actual time during which an event occurs. For example, performing the prediction in real time can mean that inputs to the deep learning models are made quickly enough during the flight of aircraft on a flight path such that a prediction of sequential maximum sound pressure levels can be received immediately as feedback. In other words, the prediction can be received quickly enough such that actions can be taken or adjustments can be made to the flight of the aircraft using a particular flight path.

In one illustrative example, one or more technical solutions are present that overcome a problem with predicting maximum sound pressure levels for aircraft flying over location such as an airport with the desired level of accuracy. As a result, one or more solutions can provide a solution that employs deep learning models to predict aircraft noise more accurately as compared to current techniques. For example, deep learning system 202 can provide sequential maximum sound pressure levels 208 with a mean error of less than 2 dB(A) with a 0.2 dBA of standard deviation for both arrival and departures flights. This level of accuracy shows a higher level of improvement as compared to current aircraft noise prediction program (ANOPP2), which is an improved version of ANOPP that has a mean error of less than 4 dBA for departures for computing a maximum sound pressure level but has issues in computing this value for arrivals. The units dBA means the decibels measured are an expression of loudness of sounds in air as perceived by the human ear.

Computer system 212 can be configured to perform at least one of the steps, operations, or actions described in the different illustrative examples using software, hardware, firmware, or a combination thereof. As a result, computer system 212 operates as a special purpose computer system in which controller 214 in computer system 212 enables predictions of maximum sound pressure levels for flights of aircraft using different flight paths. In particular, controller 214 transforms computer system 212 into a special purpose computer system as compared to currently available general computer systems that do not have controller 214.

The illustration of noise environment 200 and the different components in figures in FIGS. 2-4 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, controller 214 trains additional deep learning models to provide predictions of sequential maximum sound pressure levels 208 for other aircraft in addition to or in place of aircraft 206. Further, computer system 212 can include components in aircraft 206 such that controller 214 can operate within aircraft 206 to predict sequential maximum sound pressure levels 208 in real time. With this location of components in aircraft 206, controller 214 can more easily obtain sensor data from aircraft 206 in real time and make a real time prediction of sequential maximum sound pressure levels 208 for aircraft 206.

Further, controller 214 may be located on a single computer or distributed in multiple computers in in computer system 212. Additionally, the functionality of controller 214 can be implemented as a service in cloud computing environment 231. This service can be microservice 255 in microservices 233, which offered to aviation authorities, regulatory agencies, air navigation service providers, airlines, and other entities. Microservices 233 can be offered on a at least one of a subscription, a per use basis, or in some other manner.

Additionally, the predictions generated can also be used to develop aircraft designs that produce less noise. Further, these predictions can also be used to reconfigure, upgrade, or retrofit current aircraft to reduce noise produced by the aircraft.

Figure 5:
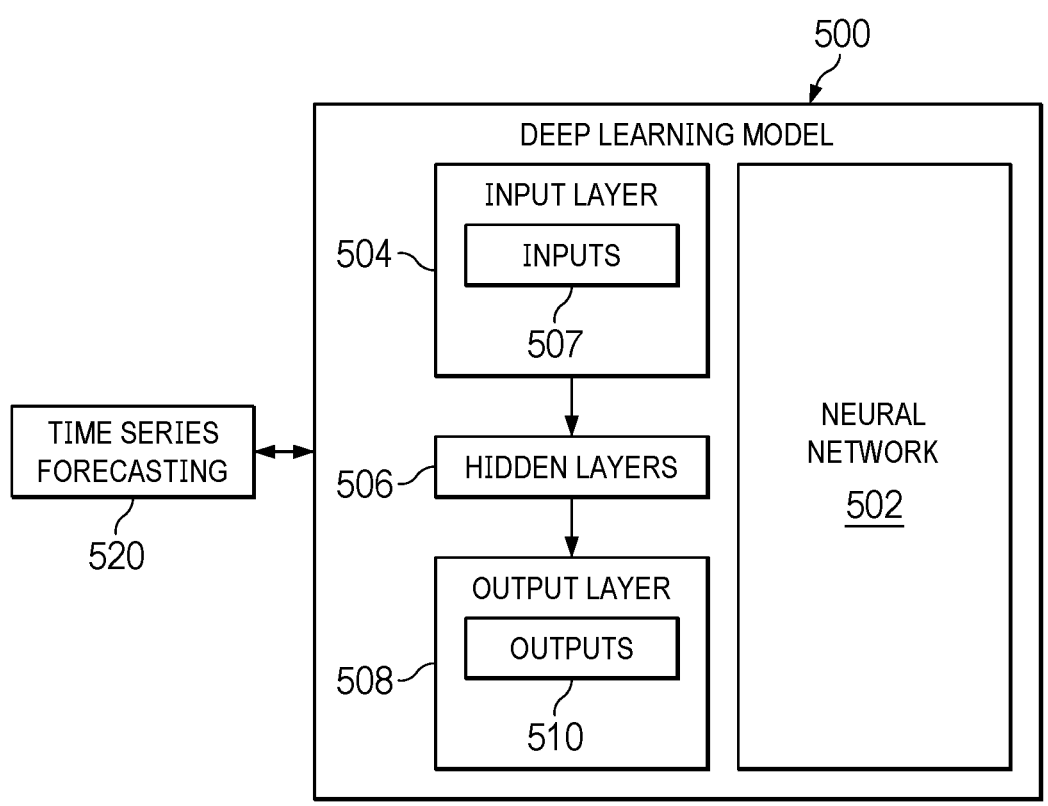
FIG. 5 is an illustration for a deep learning model in accordance with an illustrative embodiment.

Turning to FIG. 5, an illustration for a deep learning model is depicted in accordance with an illustrative embodiment. As depicted, deep learning model 500 can take the form of neural network 502. In this example, deep learning model 500 comprises input layer 504, a set of hidden layers 506, and output layer 508.

In this example, the number of inputs 507 are in input layer 504 corresponds to the first set of the sequential maximum sound pressure levels 208 recorded by a first consecutive set of microphones 237 along first portion 241 of flight path 216 already flown by aircraft 206. The number of outputs 510 in output layer 508 correspond to the second set of the sequential maximum sound pressure levels 208 that are predicted to be recorded by the second consecutive set of microphones 237 along second portion 243 of flight path 216 that will be flown by aircraft 206.

In this example, each input corresponds to a microphone in the first consecutive set of microphones 237 and each output corresponds to a microphone in the second consecutive set of microphones 237. The number of inputs 507 in input layer 504 and the number of outputs 510 in output layer 508 can be the same or different.

In other words, the number of microphones used as inputs can be different from the number of microphones used as outputs for which predictions are made for maximum sound pressure levels. For example, the number of inputs 507 can be 3 and the number of outputs 510 can be 4. In another example, number of inputs 507 can be 3 and the number of outputs 510 can be 3. In yet another example, the number of inputs 507 can be 1 and the number of outputs 510 can be 3. Further, first consecutive set of microphones 237 and second consecutive set of microphones 237 are consecutive to each other without a gap being present between the sets of microphones 237.

As depicted hidden layers 506 can take a number of different forms. For example, hidden layers 506 can be selected from at least one of an encoder-decoder long short-term memory model, a convolutional neural network long short-term memory encoder decoder model, or a convolutional long short-term memory encoder-decoder model, or other suitable type of model.

In this example, deep learning model 500 uses autoregression for time series forecasting 520. With this type of prediction, the first set of the sequential maximum sound pressure levels 208 recorded by the first consecutive set of the microphones 237 is a function of prior sequential time steps input into the deep learning model 500 and deep learning model 500 outputs the second set of sequential maximum sound pressure levels 208 as a function of subsequent sequential time steps.

Figure 6:
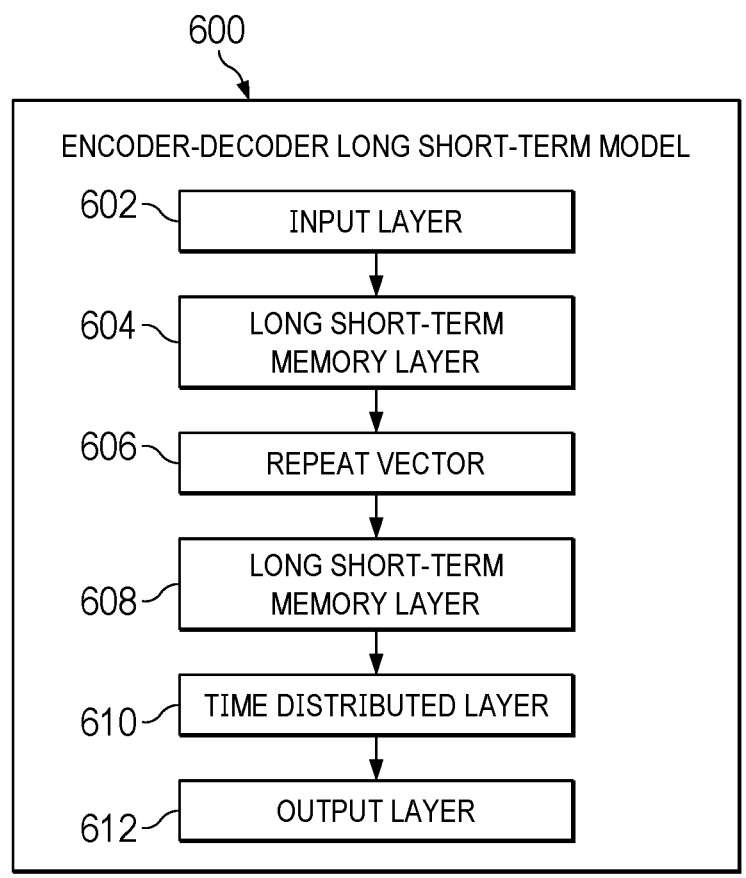
FIG. 6 is an illustration of a block diagram of an encoder-decoder long short-term memory model in accordance with an illustrative embodiment.

With reference next to FIG. 6, an illustration a block diagram of an encoder-decoder long short-term memory model is depicted in accordance with an illustrative embodiment. In this example, encoder-decoder long short-term memory model 600 is an example of one implementation for deep learning model 500 in FIG. 5.

In this illustrative example, encoder-decoder long short-term memory model 600 has a number of different components. As depicted, encoder-decoder long short-term memory model 600 comprises input layer 602, long short-term memory layer 604, repeat vector 606, long short-term memory layer 608, time distributed layer 610, and output layer 612. Long short-term memory layer 604, repeat vector 606, long short-term memory layer 608, and time distributed layer 610 are hidden layers 506 in encoder-decoder long short-term memory model 600.

In this example, input layer 602 can have a number of inputs that receive values for recorded sequential maximum pressure levels that have been recorded for a first portion of a flight path that an aircraft has flown so far. These values are used in hidden layers 506 to predict future sequential maximum pressure levels that will occur for the aircraft based on the recorded sequential maximum pressure levels into input layer 602. In this example, the future sequential maximum pressure levels are a second set of sequential maximum pressure levels that will be recorded as the aircraft flies a second portion of the flight path during the same flight.

The recorded sequential maximum pressure levels received at number of inputs in input layer 602 are sent to long short-term memory layer 604 in encoder-decoder long short-term memory model 600. Long short-term memory layer 604 can comprise a set of long short-term memory layers and a set of neurons. For example, long short-term memory layer 604 can comprise a layer comprising 200 long short-term memory neurons. The long short-term memory neuron can also be referred to as a long short-term memory unit. The long short-term memory neuron is part of a recurrent neural network structure that comprises various components such as cells, an input gate, and an output gate. The long short-term memory neuron uses a chain structure that comprises neural networks and memory blocks established for short-term memory processes to create long-term memory.

In this illustrative example, long short-term memory layer 604 is an encoder of encoder-decoder long short-term memory model 600. In this example, long short-term memory layer 604 receives the number of inputs from input layer 602 as an input sequency and reads the input sequency step-by-step. In this illustrative example, long short-term memory layer 604 learns the relationship between the steps in the input sequence of the number of inputs from input layer 602 and develops a learned internal representation of the input sequence of the number of inputs from input layer 602 as a fixed-length vector.

In this example, the fixed-length vector represents the learned internal representation of the input sequence by long short-term memory layer 604. Further, in this illustrative example, the fixed-length vector is an output from long short-term memory layer 604 and is received by repeat vector 606.

As depicted, repeat vector 606 is a layer in encoder-decoder long short-term memory model 600. A repeat vector is a layer that transforms a fixed-length vector by repeating the fixed-length vector for n number of times. For example, a repeat vector transforms a fixed length vector having two-dimensional matrix of outputs into a three-dimensional matrix of outputs. In an encoder-decoder long short-term memory model the repeat vector can be incorporated as an adapter to establish a connection between the encoder and the decoder by transforming the fixed-length two-dimensional output of the encoder into varying-length three-dimensional input required by the decoder.

In this illustrative example, repeat vector 606 receives the fixed-length vector having a two-dimensional matrix of outputs from long short-term memory layer 604 and transforms the fixed-length vector into a three-dimensional matrix of outputs as required by long short-term memory layer 608. In other words, the internal representation of the input sequence is repeated multiple times, once for each time step in the output sequence to form a sequence of vectors that are sent from repeat vector 606 to long short-term memory layer 608.

Long short-term memory layer 608 can comprise a set of long short-term memory layers and a set of neurons. For example, long short-term memory layer 608 can comprise a layer comprising 200 long short-term memory neurons. In this example, long short-term memory layer 608 is a decoder in encoder-decoder long short-term memory model 600. A decoder in a long short-term memory model transforms the learned internal representation of the input sequency by the encoder into the correct output sequence. In other words, the decoder transforms the fixed length vector from the encoder that has been converted into a three-dimensional matrix of outputs by the repeat vector into the correct output sequence.

The correct output sequence can be referred to as a complete output sequence having an expected length and dimension. For example, the correct output sequence can be generated using a connected layer to interpret each time step in the output sequence before the final output layer. In this example, the correct output sequence assists the long short-term memory model in making predictions.

In this illustrative example, long short-term memory layer 608 receives the three-dimensional matrix of outputs from repeat vector 606 and outputs the correct output sequence to time distributed layer 610. Time distributed layers are utilized to apply one or more layers to a set of inputs to generate an output for each input in the set of inputs to pass the output to a subsequent layer in the neural network.

Time distributed layer 610 can comprise one or more neurons. For example, time distributed layer 610 can have 100 neurons.

In this example, time distributed layer 610 wraps an interpretation layer and output layer 612 of encoder-decoder long short-term memory model 600. In other words, time distributed layer 610 applies layers to be used for each time step from the decoder. In this example, time distributed layer 610 is a time distributed wrapper that allows wrapped layers to be used in each time step from the decoder.

Wrapping the interpretation layer and output layer enables the decoder to determine the context required for each step in the output sequence and the wrapped dense layers to interpret each time step separately while using the same weights to perform the interpretation. As a result, time distributed layer 610 enables output layer 612 to predict a single step in the output sequence.

In this example, output layer 612 can have a number of time distributed outputs. The time distributed outputs are generated by hidden layers 506. For example, outputs in output layer include predictions of future sequential maximum pressure levels that will occur for the aircraft on the portion of the flight path that the aircraft will flow based on the recorded sequential maximum pressure levels for the portion of the flight path already flown by the aircraft.

Figure 7:
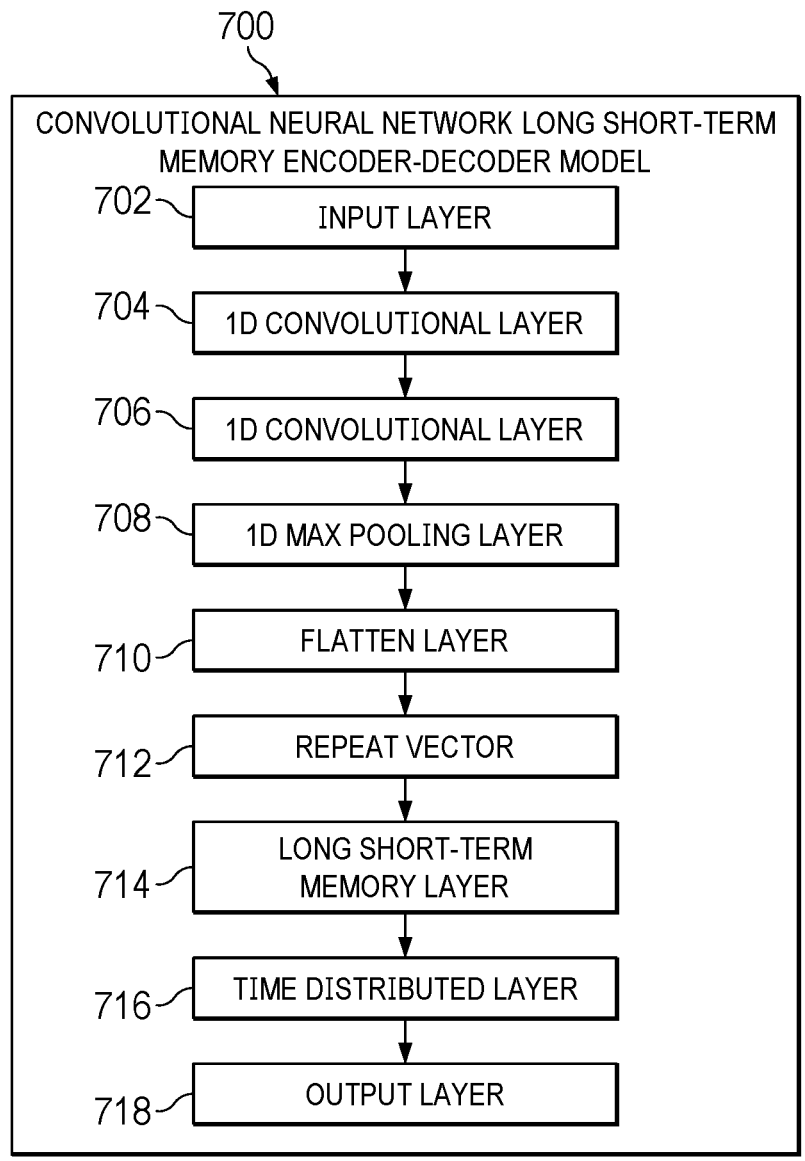
FIG. 7 is an illustration is an illustration of a block diagram of a convolutional neural network long short-term memory encoder-decoder model in accordance with an illustrative embodiment.

FIG. 7 is an illustration of a block diagram of a convolutional neural network long short-term memory encoder-decoder model is depicted in accordance with an illustrative embodiment. In this depicted example, convolutional neural network long short-term memory encoder-decoder model 700 is an example of one implementation for deep learning model 500 in FIG. 5.

In this illustrative example, convolutional neural network long short-term memory encoder-decoder model 700 has a number of different components. As depicted in this example, convolutional neural network long short-term memory encoder-decoder model 700 comprises input layer 702, 1D convolutional layer 704, 1D convolutional layer 706, 1D max pooling layer 708, flatten layer 710, repeat vector 712, long short-term memory layer 714, time distributed layer 716, and output layer 718. In this example, 1D convolutional layer 704, 1D convolutional layer 706, 1D max pooling layer 708, flatten layer 710, repeat vector 712, long short-term memory layer 714, and time distributed layer 716 in convolutional neural network long short-term memory encoder-decoder model 700 are examples of hidden layers 506 in FIG. 5.

In this depicted example, input layer 702 has a number of inputs that can receive values for recorded sequential maximum pressure levels that have been recorded for a first portion of a flight path that an aircraft has flown so far. These values are used in the hidden layers to predict future sequential maximum pressure levels that will occur for the aircraft based on the recorded sequential maximum pressure levels input into input layer 702. In this example, the future sequential maximum pressure levels are a second set of sequential maximum pressure levels that will be recorded as the aircraft flies a second portion of the flight path during the same flight.

The recorded sequential maximum pressure levels received at number of inputs in input layer 702 are sent to 1D convolutional layer 704. This layer can receive a three-dimensional tensor and outputs a three-dimensional tensor. In this example, 1D convolutional layer 704 can also be referred to as temporal convolution. This layer creates a convolution kernel that is convolved with the layer input over a single spatial dimension to produce a tensor of outputs.

In this example, 1D convolutional layer 704 operates as an encoder. 1D convolutional layer 704 reads across the input sequence and projects the results onto feature maps. These feature maps can capture the result of applying filters to an input of a convolutional layer.

For example, 64 feature maps can be present at each convolutional layer. In this illustrative example, 1D convolutional layer 704 sends features maps to 1D convolutional layer 706.

As depicted, 1D convolutional layer 706 reads across the input sequence of the feature maps received from 1D convolutional layer 704 and projects the results onto feature maps. In this example, 1D convolutional layer 706 sends the feature maps to 1D max pooling layer 708.

As depicted, when 1D max pooling layer 708 receives a feature map, 1D max pooling layer 708 selects the maximum element from the region of the feature map covered by the filter. In other words, the output from 1D max pooling layer 708 is a feature map having a reduced dimension and containing the most prominent features of the previous feature map. In other words, 1D max pooling layer 708 can identify the presence of features, which include features that that have the most activated presence to form prominent features. For example, the brightest pixels can be prominent features.

In this illustrative example, 1D max pooling layer 708 outputs the most prominent features of the feature maps received from 1D convolutional layer 706 to flatten layer 710.

As depicted, flatten layer 710 can receive multi-dimensional input tensors and flatten these tensors into a single dimension. Flatten layer 710 sends the flattened tensors to repeat vector 712. In other words, flatten layer 710 can convert muti-dimensional arrays from pooled feature maps into a single fixed length linear vector to model the input layer and build the neural network model. In this example, flatten layer 710 transforms feature maps from 1D convolutional layer 706 to a fixed length linear vector.

In this example, the fixed-length vector represents the learned internal representation of the input sequence by 1D convolutional layer 704 and 1D convolutional layer 706, which is the encoder stage in this example. Further, in this illustrative example, flatten layer 710 sends the fixed-length vector to repeat vector 712.

As depicted, repeat vector 712 transforms a fixed-length vector by repeating the fixed-length vector for n number of times. For example, a repeat vector can transform a fixed length vector having single-dimensional matrix of outputs into a three-dimensional matrix of outputs. In convolutional neural network long short-term memory encoder-decoder model 700, repeat vector 712 can be incorporated as an adapter to establish a connection between the encoder and the decoder by transforming the fixed-length single dimension output of the encoder into varying-length three-dimensional input required by the decoder. In other words, repeat vector 712 transforms the fixed-length vector from flatten layer 710 into a multi-dimensional matrix for input into long short-term memory layer 714.

In this illustrative example, repeat vector 712 transforms the fixed-length vector received from flatten layer 710 into a three-dimensional matrix of outputs as required by long short-term memory layer 714. In other words, the internal representation of the input sequence is repeated multiple times, once for each time step in the output sequence to form a sequence of vectors that are sent from repeat vector 712 to long short-term memory layer 714.

Long short-term memory layer 714 can comprise a set of long short-term memory layers and a set of neurons. For example, long short-term memory layer 714 can comprise a layer comprising 200 long short-term memory neurons.

In this depicted example, long short-term memory layer 714 operates as a decoder of convolutional neural network long short-term memory encoder-decoder model 700. A decoder in convolutional neural network long short-term memory encoder-decoder model 700 transforms the learned internal representation of the input sequency by the encoder into the correct output sequence. In other words, the decoder transforms the fixed length vector from the encoder that has been converted into a three-dimensional matrix of outputs by the repeat vector into the correct output sequence.

The correct output sequence can be referred to as a complete output sequence having an expected length and dimension. For example, the correct output sequence can be generated using a connected layer to interpret each time step in the output sequence before the final output layer. In this example, the correct output sequence assists the convolutional neural network long short-term memory encoder-decoder model in making predictions.

In this illustrative example, long short-term memory layer 714 receives the three-dimensional matrix of outputs from repeat vector 712 and outputs the correct output sequence to time distributed layer 716. Time distributed layer 716 can comprise one or more neurons. For example, time distributed layer 716 can comprise 100 neurons.

In this depicted example, time distributed layer 716 wraps an interpretation layer and output layer 718 of convolutional neural network long short-term memory encoder-decoder model 700. In other words, time distributed layer 716 applies layers to be used for each time step from the decoder. In this illustrative example, time distributed layer 716 is a time distributed wrapper that allows wrapped layers to be used in each time step from the decoder.

Wrapping the interpretation layer and output layer 718 enables the decoder to determine the context required for each step in the output sequence and the wrapped dense layers to interpret each time step separately while using the same weights to perform the interpretation. As a result, time distributed layer 716 enables output layer 718 to predict a single step in the output sequence.

In this example, output layer 718 can have a number of time distributed outputs. The time distributed outputs are generated by hidden layers. For example, outputs in output layer include predictions of future sequential maximum pressure levels that will occur for the aircraft on the portion of the flight path that the aircraft will flow based on the recorded sequential maximum pressure levels for the portion of the flight path already flown by the aircraft.

Figure 8:
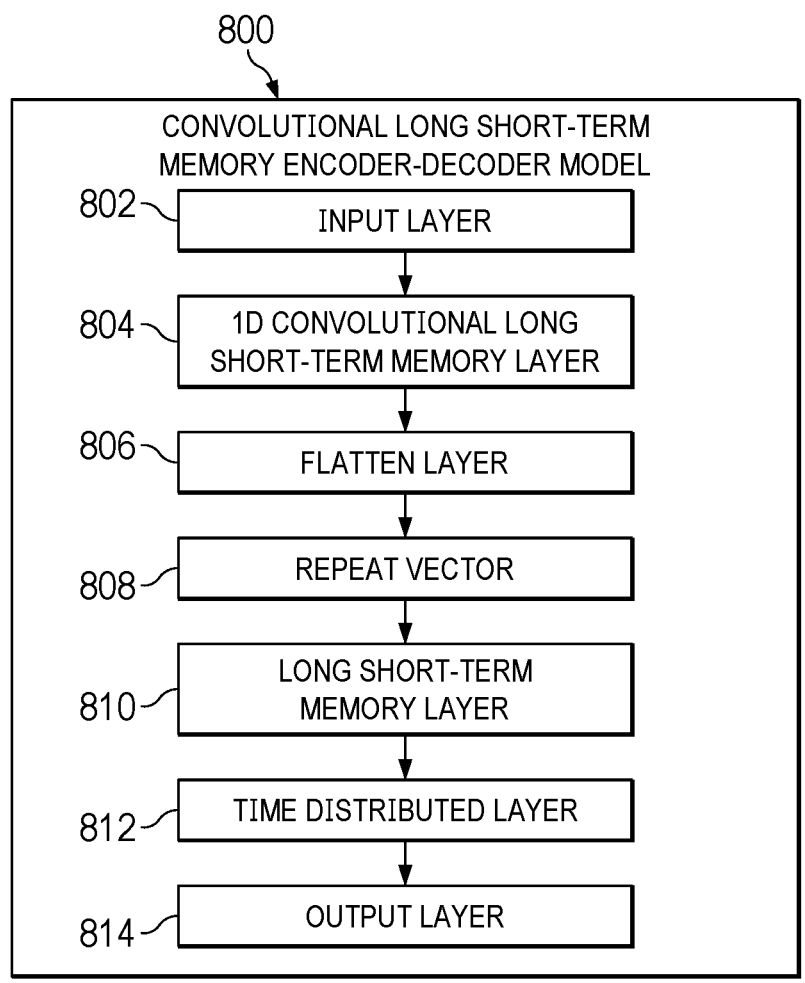
FIG. 8 is an illustration of a block diagram of a convolutional long short-term memory encoder-decoder model in accordance with an illustrative embodiment.

With reference next to FIG. 8, an illustration of a block diagram of a convolutional long short-term memory encoder-decoder model is depicted in accordance with an illustrative embodiment. In this example, convolutional long short-term memory encoder-decoder model 800 is an example of one implementation for deep learning model 500 in FIG. 5.

In this illustrative example, convolutional long short-term memory encoder-decoder model 800 has a number of different components. As depicted, convolutional long short-term memory encoder-decoder model 800 comprises input layer 802, 1D convolutional long short-term memory layer 804, flatten layer 806, repeat vector 808, long short-term memory layer 810, time distributed layer 812, and output layer 814. In this example, 1D convolutional long short-term memory layer 804, flatten layer 806, repeat vector 808, long short-term memory layer 810, and time distributed layer 812 in convolutional long short-term memory encoder-decoder model 800 are examples of hidden layers 506 in FIG. 5.

In this illustrative example, long short-term memory encoder-decoder model 800 uses convolutions directly as part of reading input into the long short-term memory neurons themselves. In other words, convolutional long short-term memory encoder-decoder model 800 is different from encoder-decoder long short-term memory model 600 that reads the data directly to calculate internal state and state transitions and is different from convolutional neural network long short-term memory encoder-decoder model 700 that interprets the output from convolutional neural network models.

In this depicted example, input layer 802 has a number of inputs that can receive values for recorded sequential maximum pressure levels that have been recorded for a first portion of a flight path that an aircraft has flown so far. These values received by inputs in input layer 802 are used sent to subsequent layers to predict future sequential maximum pressure levels that will occur for the aircraft based on the recorded sequential maximum pressure levels into input layer 802. In this example, the future sequential maximum pressure levels are a second set of sequential maximum pressure levels that will be recorded as the aircraft flies a second portion of the flight path during the same flight.

The recorded sequential maximum pressure levels received at number of inputs in input layer 802 are sent to 1D convolutional long short-term memory layer 804 in convolutional long short-term memory encoder-decoder model 800. A convolutional long short-term memory layer comprises both convolutional structures in both the input-to-state and state-to-state transitions and long short-term memory model structures to make spatial-temporal predictions. The convolutional long short-term memory layer uses convolutions directly as part of reading input into the long short-term memory neurons themselves. The convolutional long short-term memory layer determines the future state of a certain cell in the grid by the inputs and past states of its local neighbors.

In this example, 1D convolutional long short-term memory layer 804 acts as an encoder in convolutional long short-term memory encoder-decoder model 800. 1D convolutional long short-term memory layer 804 reads across the input sequence and projects the results onto feature maps. These feature maps capture the result of applying filters to an input of a convolutional layer.

For example, 64 feature maps can be present at each convolutional layer. In this illustrative example, 1D convolutional long short-term memory layer 804 sends feature maps to flatten layer 806.

As depicted flatten layer 806 is a layer in convolutional long short-term memory encoder-decoder model 800. In this example, flatten layer 806 transforms feature maps from 1D convolutional long short-term memory layer 804 to a fixed length linear vector. In this example, the fixed-length vector represents the learned internal representation of the input sequence by 1D convolutional long short-term memory layer 804, which is an encoder stage. Further, in this illustrative example, the fixed-length vector is an output from flatten layer 806 and is received by repeat vector 808.

As depicted, repeat vector 808 is a layer in convolutional long short-term memory encoder-decoder model 800. In convolutional long short-term memory encoder-decoder model 800, repeat vector 808 can be incorporated as an adapter to establish a connection between the encoder and the decoder by transforming the fixed-length single dimension output of the encoder into varying-length three-dimensional input required by the decoder. In other words, repeat vector 808 transforms the fixed-length vector from flatten layer 806 into a multi-dimensional matrix for input into long short-term memory layer 810.

In this illustrative example, repeat vector 808 transforms the fixed-length vector received from flatten layer 806 into a three-dimensional matrix of outputs as required by long short-term memory layer 810. In other words, the internal representation of the input sequence is repeated multiple times, once for each time step in the output sequence to form a sequence of vectors that are sent from repeat vector 808 to long short-term memory layer 810.

Long short-term memory layer 810 can comprise a set of long short-term memory layers and a set of neurons. For example, long short-term memory layer 810 can comprise a layer comprising 200 long short-term memory neurons.

In this depicted example, long short-term memory layer 810 operates as a decoder of convolutional long short-term memory encoder-decoder model 800. In this illustrative example, long short-term memory layer 810 receives the three-dimensional matrix of outputs from repeat vector 808 and outputs the correct output sequence to time distributed layer 812. In this depicted example, time distributed layer 812 can comprise one or more neurons. For example, time distributed layer 812 can comprise 100 neurons.

In this depicted example, time distributed layer 812 wraps an interpretation layer and output layer 814 of convolutional long short-term memory encoder-decoder model 800. In other words, time distributed layer 812 applies layers to be used for each time step from the decoder. In this illustrative example, time distributed layer 812 is a time distributed wrapper that allows wrapped layers to be used in each time step from the decoder.

Wrapping the interpretation layer and output layer 814 enables the decoder to determine the context required for each step in the output sequence and the wrapped dense layers to interpret each time step separately while using the same weights to perform the interpretation. As a result, time distributed layer 812 enables output layer 814 to predict a single step in the output sequence.

In this example, output layer 814 can have a number of time distributed outputs. The time distributed outputs are generated by hidden layers 506. For example, outputs in output layer include predictions of future sequential maximum pressure levels that will occur for the aircraft on the portion of the flight path that the aircraft will flow based on the recorded sequential maximum pressure levels for the portion of the flight path already flown by the aircraft.

The architectures of encoder-decoder long short-term model 600, convolutional neural network long short-term memory encoder-decoder model 700, or a convolutional long short-term memory encoder-decoder model 800 can be implemented using Keras. Keras is an open source software library that provides a Python interface for neural networks. Kera is a neural network library and provides a deep learning API written Python that runs on top of a machine learning platform TensorFlow.

Further, the illustrations of the different deep learning models in FIGS. 6-8 are not meant to limit the manner in which other illustrative examples can be implemented. Other deep learning architectures can be used that can provide predictions of future sequences of maximum sound pressure levels along the flight path from prior sequences of maximum sound pressure levels recorded for the flight path can be used.

Figure 9:
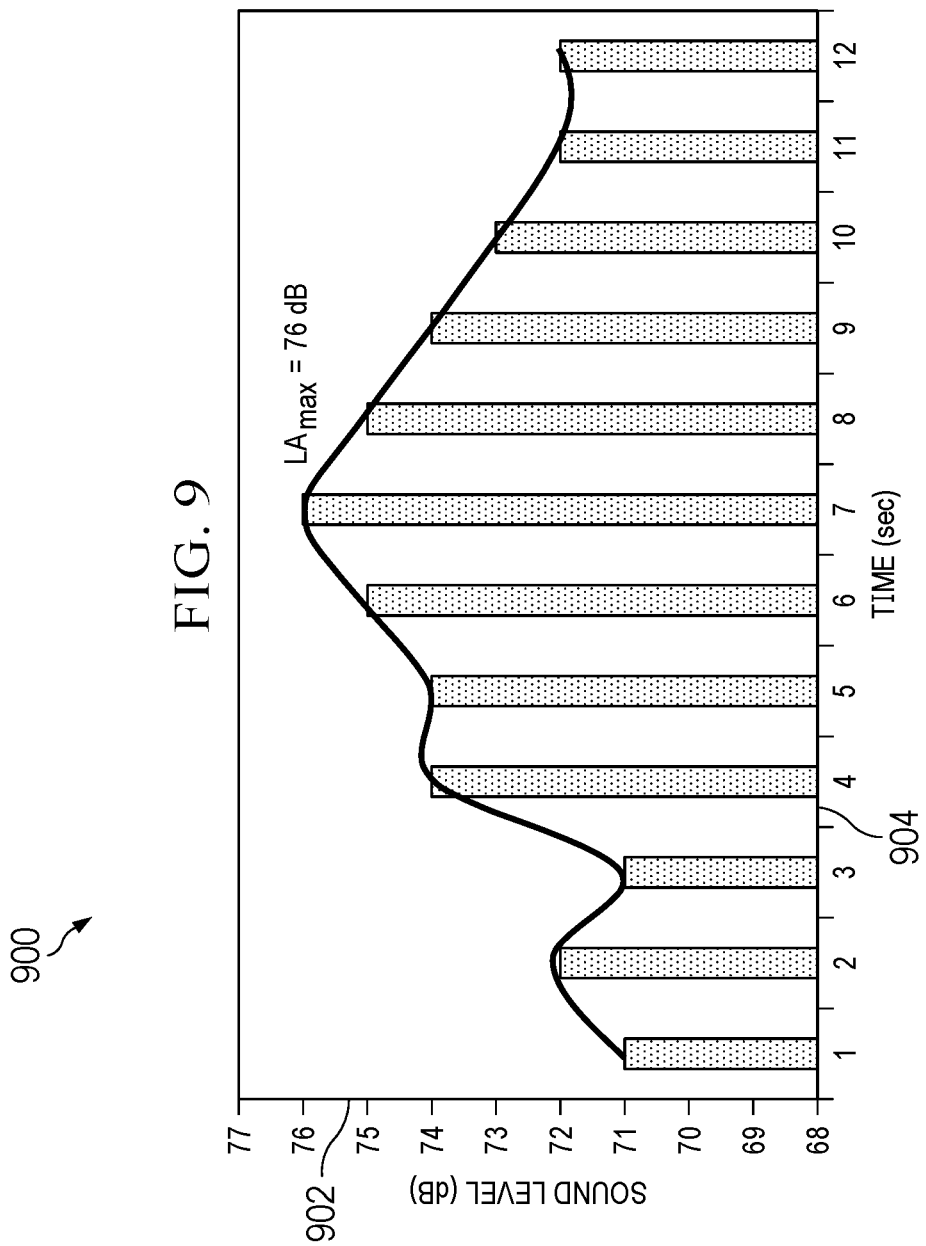
FIG. 9 is an illustration of a graph of a noise event in accordance with an illustrative embodiment.

Turning now to FIG. 9, an illustration of a graph of a noise event is depicted in accordance with an illustrative embodiment. In this illustrative example, graph 900 is a graph of a noise event recorded by a microphone and a microphone system at an airport. As depicted, y-axis 902 is the sound level in dB and x-axis 904 is time in seconds.

As depicted, the noise level starts at ambient or background noise level at time equal to one second and level rises to a maximum level, representing the maximum sound pressure level (LAmax) as aircraft flies closer to the microphone. In this example, the maximum sound pressure level is of 76 dB at seven seconds. The noise level decreases as the aircraft proceeds into the distance. In this example, the noise event duration is 12 seconds.

In the illustrative examples, sequential maximum sound pressure levels, such as the one shown in graph 900, can be predicted in real time for an unflown portion of a flight path can be predicted in real time in response to detecting sequential maximum sound pressure levels recorded for the portion of the flight path already flown.

Figure 10:
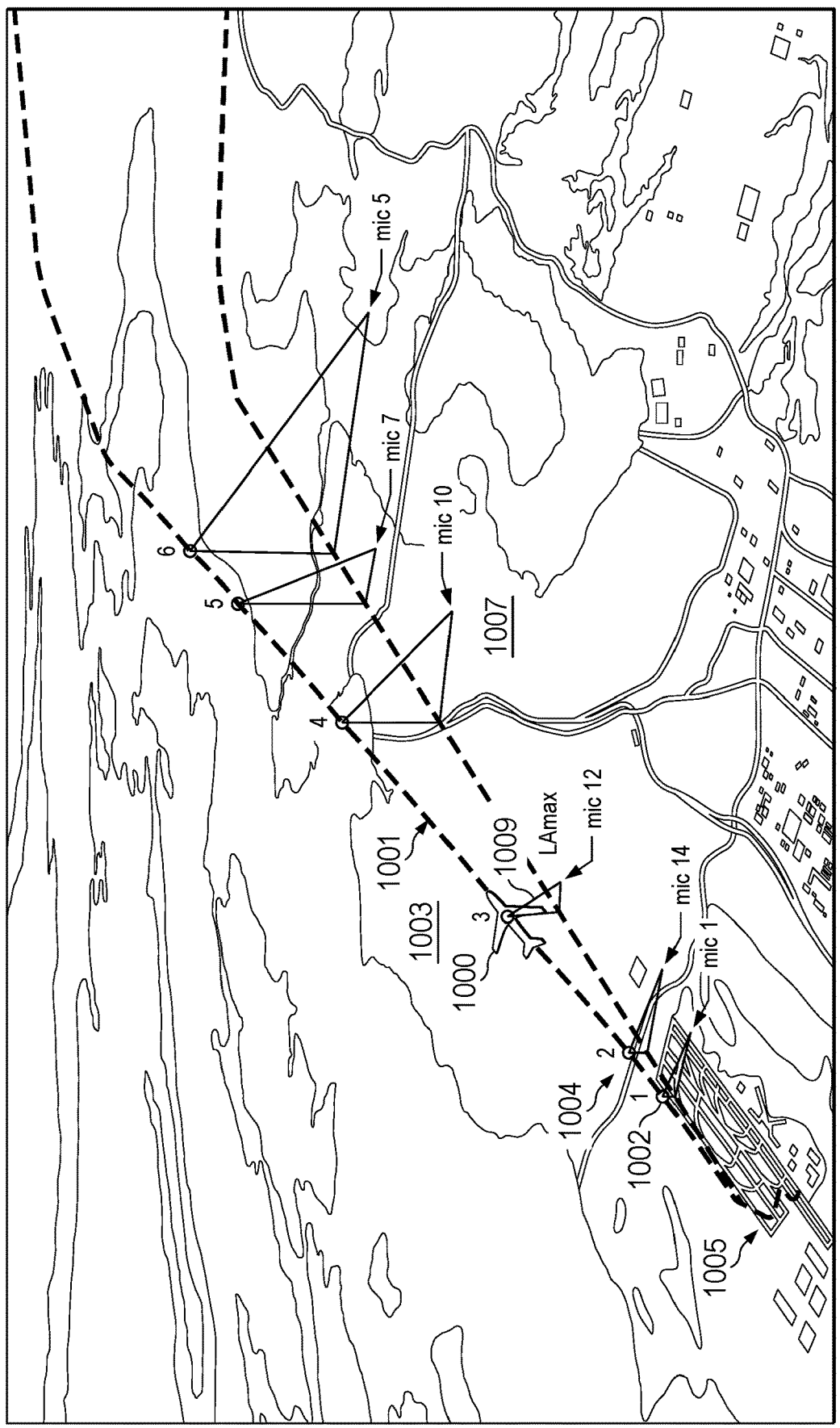
FIG. 10 is an illustration of a flight path for departures of an aircraft in accordance with an illustrative embodiment.

Turning next to FIG. 10, an illustration of a flight path for departures of an aircraft is depicted in accordance with an illustrative embodiment. In this illustrative example, aircraft 1000 flies on a flight path 1001 identified by waypoints 1002. In this depicted example, waypoints 1002 comprises waypoints 1-6. As depicted, waypoints 1004 are over location 1003. Location 1003 includes airport 1005 and adjacent area 1007.

As depicted, aircraft 1000 is located at waypoint 3 in waypoints 1002. In this example, microphone 12 has minimum slant distance 1009 to aircraft 1000. In this example, waypoint 3 can be location for the time at which microphone 12 records the maximum sound pressure level for aircraft 1000.

Waypoint 6 defines the portion of the flight in flight path 1001 that has been flown by aircraft 1000. Aircraft 1000 has already flown on the portion of flight path 1001 with waypoint 1 and waypoint 2. Microphone 1 has recorded the maximum sound pressure level for aircraft 1000 at waypoint 1. Maximum sound pressure level for aircraft 1000 has also been recorded by microphone 14 at waypoint 2. Further, maximum sound pressure level for aircraft 1000 has also been recorded by microphone 12 at waypoint 3.

These three recorded maximum sound pressure levels are a first set of sequential maximum sound pressure levels recorded by a first consecutive set of microphones, microphone 1, microphone 12, and microphone 14.

A second set of sequential maximum sound pressure levels that will be recorded by a second consecutive set of microphones can be predicted using deep learning models in these examples. The second consecutive set of microphones are microphone 10, microphone 7, and microphone 5 for when aircraft 1000 flies to waypoint 4, waypoint 5, and waypoint 6, respectively, in flight path 1001 that is yet to be flown.

Thus, this prediction is performed using the maximum sound pressure levels recorded at microphone 1 at waypoint 1, microphone 14 at waypoint 2, and microphone 12 at waypoint 3. The sound pressure levels and other information about the sound pressure can be received as sound data and can be part of airport data received from airport.

The prediction is for maximum sound pressure levels that will be recorded by microphones at the next three waypoints, microphone 10 at waypoint 4, microphone 7 at waypoint 5, and microphone 5 at waypoint 6. This prediction is performed in real time as aircraft 1000 flies on flight path 1001.

In other illustrative examples, other numbers of recorded maximum number of sound pressure levels can be used to predict other numbers of maximum sound pressure levels. For example, the first set of sequential maximum sound pressure levels can be 3 while the second set of sequential maximum sound pressure levels can be 4. In another example, the first set of sequential maximum sound pressure levels can be 2 while the second set of sequential maximum sound pressure levels can be 5. These and other numbers of inputs and outputs can be used depending on the particular implementation.

Further, in this example, sensor data from sensor readings for aircraft 1000 recorded at the different way points can be correlated with other parameters to create training data in which the maximum sound pressure levels is correlated with selected features. In other words, the maximum sound pressure level can be used as a label for: sensor data, atmospheric data, and airport data, for the time instance at which microphone 12 records sound for aircraft 1000 at waypoint 3 if supervised learning is used with the deep learning models.

Figure 11:
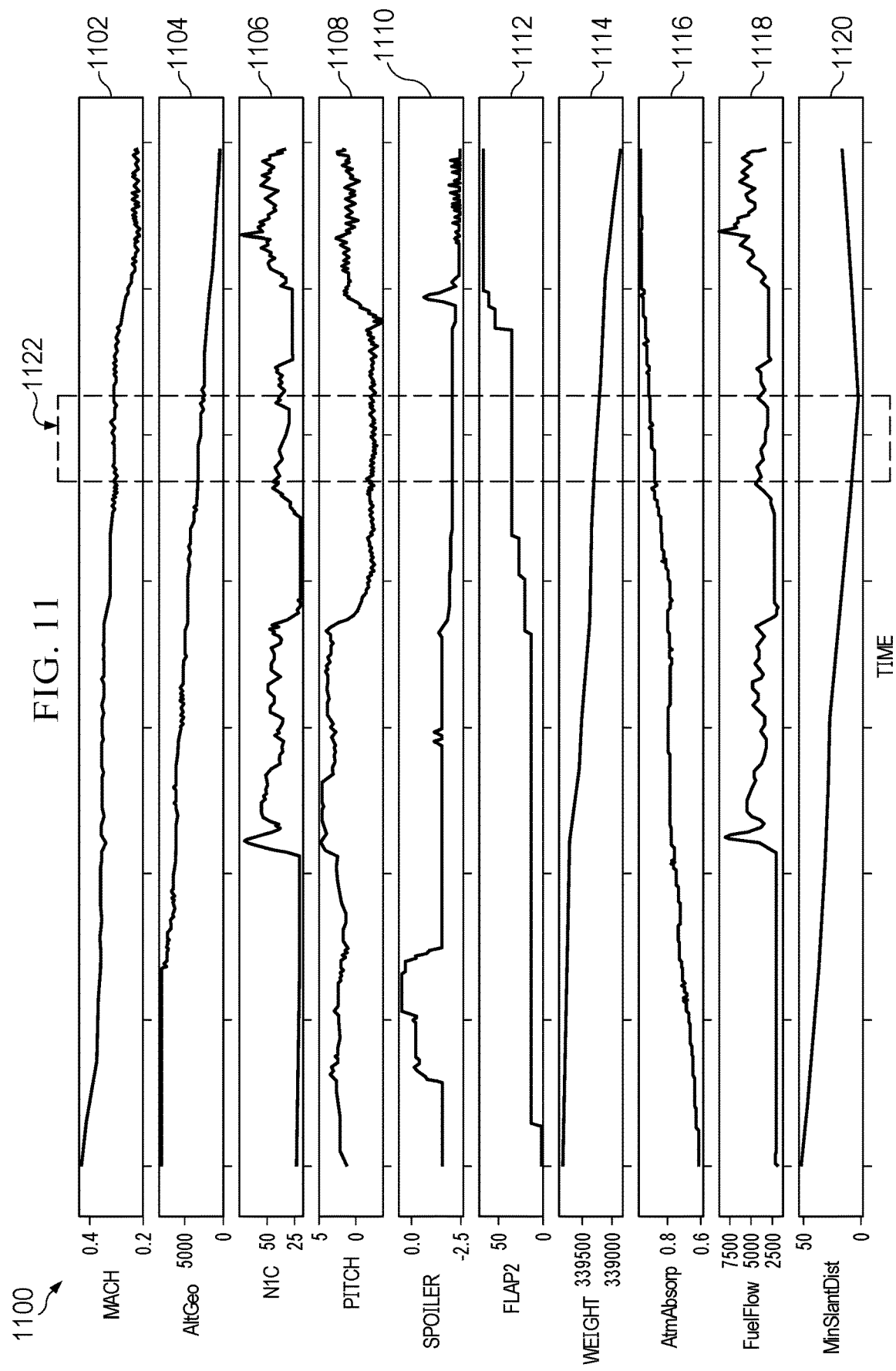
FIG. 11 is an illustration of graphs of sensor data for selected parameters in accordance with an illustrative embodiment.

With reference now to FIG. 11, an illustration of graphs of sensor data for selected parameters are depicted in accordance with an illustrative embodiment. In this illustrative example, graphs 1100 are graphs for parameters such as Mach number 1102, altitude (AltGeo) 1104, N1C 1106, pitch 1108, spoiler 1110, flap2 1112, weight 1114, atmospheric absorption (AtmAbsorp) 1116, fuel flow (FuelFlow) 1118, and minimum slant distance (MinSlantDist) 1120. The y-axes for these graphs indicate values for the associated parameters. For example, atmospheric absorption (AtmAbsorp) 1116 can be expressed in dBA. As another example, minimum slant distance (MinSlantDist) 1120 can be in mm. The X axes of graphs 1100 show time.

With the maximum sound pressure level LAmax being recorded by each microphone for an entire arrival or departure, the process can identify which time instance in graphs 1100 should be correlated to the ground truth for maximum sound pressure level LAmax to train deep learning models. In identifying the time instance, the process determines which time instance should be selected.

Heuristics searching can be performed to identify the best matching time instance. In the illustrative example, the best matching time instance is a time instance in which the slant distance to the microphone is below a threshold and selected parameters remain relatively stable with no radical changes. In this example, parameters that are relatively stable can be referred to as stable parameters. Stable parameters can be present when a moving average of the selected parameter in graph 1100 are within a threshold.

In this illustrative example, time window 1122 is used as part of a search to identify a best matching time instance for the selected parameters in graphs 1100.

These different parameters are examples of parameters in other illustrative examples, the selection of the particular time instance can involve analyzing other numbers of parameters. N1C 1106 in graph 100 is representative of engine thrust. N1C indicates the rotational speed of a low pressure (low speed) spool in an engine, usually calibrated in percent of an engine manufacturer defined maximum rotational speed that corresponds to 100%. Without limitation, graphs 1100 can include 50 selected parameters, 200 selected parameters, 750 selected parameters or other smaller or larger number of parameters in other illustrative examples.

In this example, a heuristic search algorithm using Auto Regressive Integrated Moving Average (ARIMA)—like sliding window approach can be used. With this example the average value for each parameter is compared with the value of that parameter at each time instance included in the window to determine whether parameters are stable. With this process, the search can begin from the time instance where the slant distance between the microphone and aircraft is a minimum and that search expands on both sides of this time instance where the slant distance between the microphone and aircraft is a minimum. The search ends as soon as the slant distance is the minimum or in the neighborhood of the minimum where all the selected parameters are stable. For example, the selected parameters can be considered to be stable when the values of the selected parameters do not exceed the moving average.

Figure 12:
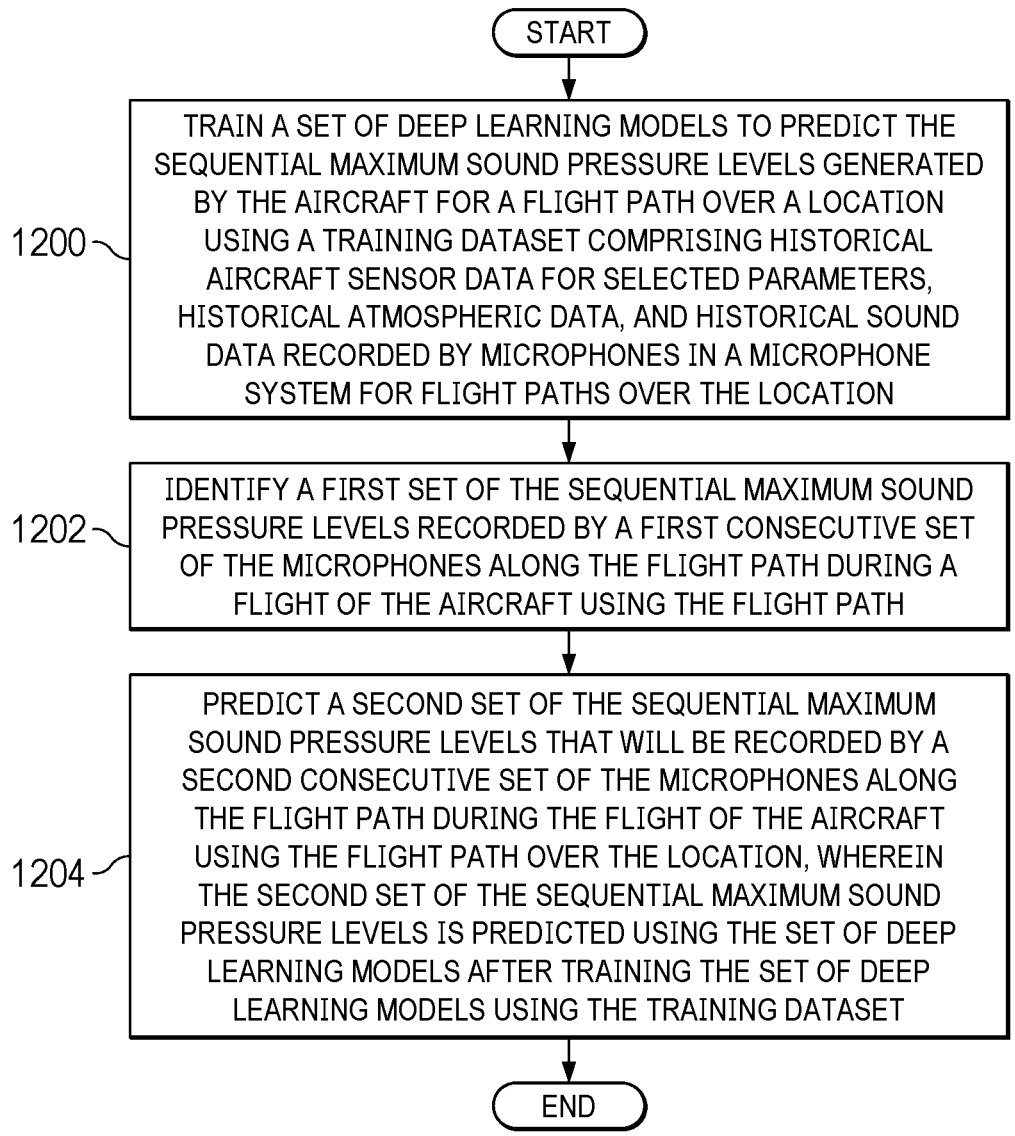
FIG. 12 is an illustration of a flowchart of a process for predicting sequential maximum sound pressure levels generated by an aircraft in accordance with an illustrative embodiment.

With reference to FIG. 12, an illustration of a flowchart of a process for predicting sequential maximum sound pressure levels generated by an aircraft is depicted in accordance with an illustrative embodiment. The process illustrated in FIG. 12 can be implemented using computer system 212 and controller 214 in FIG. 2. For example, the process can be implemented in controller 214 in computer system 212 in FIG. 2.

As depicted, the process begins by training a set of deep learning models to predict the sequential maximum sound pressure levels generated by the aircraft for a flight path over a location using a training dataset comprising historical aircraft sensor data for selected parameters, historical atmospheric data, and historical sound data recorded by microphones in a microphone system for flight paths over the location (operation 1200). The training in operation 1200 can be performed using unsupervised training.

The process identifies a first set of the sequential maximum sound pressure levels recorded by a first consecutive set of the microphones along the flight path during a flight of the aircraft using the flight path (operation 1202). The process predicts a second set of the sequential maximum sound pressure levels that will be recorded by a second consecutive set of the microphones along the flight path during the flight of the aircraft using the flight path over the location, wherein the second set of the sequential maximum sound pressure levels is predicted using the set of deep learning models after training the set of deep learning models using the training dataset (operation 1204). The process terminates thereafter.

In this example in FIG. 12, the first number of the first consecutive set of the microphones can be different from the second number of the second consecutive set of the microphones. In other words, the number of microphones used in each consecutive set of microphones do not have to be the same.

Figure 13:
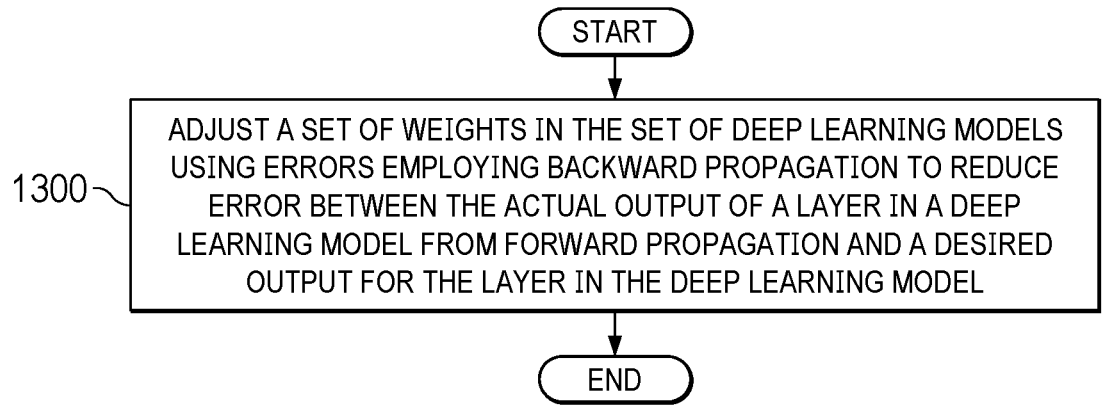
FIG. 13 is an illustration of a flowchart of a process adjusting weights in accordance with an illustrative embodiment.

With reference to FIG. 13, an illustration of a flowchart of a process adjusting weights is depicted in accordance with an illustrative embodiment. The process illustrated in FIG. 13 is an example of an operation that can be performed with the operations in FIG. 12.

The process adjusts a set of weights in the set of deep learning models using errors employing backward propagation to reduce error between the actual output of a layer in a deep learning model from forward propagation and a desired output for the layer in the deep learning model (operation 1300). The process terminates thereafter. In this example, each selected parameter in the selected parameters is assigned a different weight from other selected parameters in a deep learning model in the set of deep learning models. The assignment is made as part of initializing the weights for training the set of deep learning models.

Figure 14:
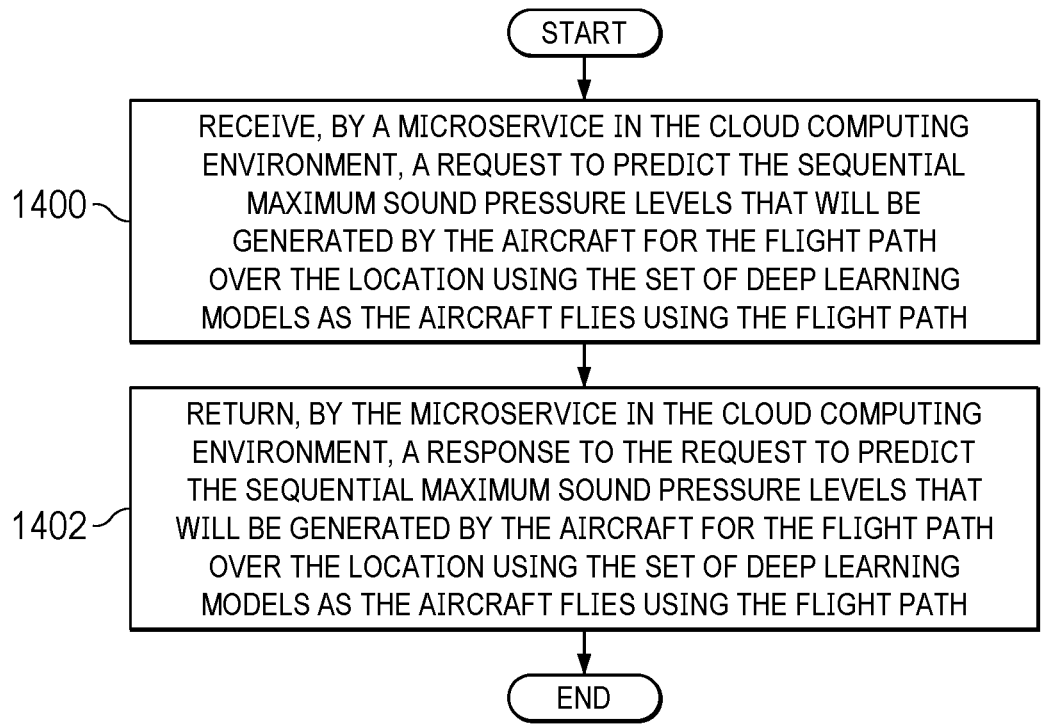
FIG. 14 is an illustration of a flowchart of a process for predicting sequential maximum sound pressure levels in a cloud environment in accordance with an illustrative embodiment.

Turning next to FIG. 14, an illustration of a flowchart of a process for predicting sequential maximum sound pressure levels in a cloud environment is depicted in accordance with an illustrative embodiment. The operations in FIG. 14 can be performed with the operations in FIG. 12. In this example, controller 214 can be implemented in a microservice in a cloud computing environment. A microservice is software in the form of a self-contained piece of functionality that communicates using a known interface such as application programming interface (API). Microservices can be used to build a distributed application using containers. Each function in the application operates as an independent service that can be updated without disrupting other services in an application.

The process begins by receiving, by a microservice in the cloud computing environment, a request to predict the sequential maximum sound pressure levels that will be generated by the aircraft for the flight path over the location using the set of deep learning models as the aircraft flies using the flight path (operation 1400). The request in operation 1400 can include a first set of the sequential maximum sound pressure levels recorded by a first consecutive set of the microphones along the flight path during the flight of the aircraft using the flight path. This request is received in real time as the aircraft flies using the flight path. The request can also include other input data such as aircraft sensor data and atmospheric data in addition to the sound data with the first set of the sequential maximum sound pressure levels. In this example, the prediction can be made using operation 1204 in FIG. 12.

The process returns, by the microservice in the cloud computing environment, a response to the request to predict the sequential maximum sound pressure levels that will be generated by the aircraft for the flight path over the location using the set of deep learning models as the aircraft flies using the flight path (operation 1402). The process terminates thereafter. In operation 1402, the prediction made in operation 1204 in FIG. 12 is returned in the response.

The response is a prediction that includes a second set of the sequential maximum sound pressure levels that will be recorded by a second consecutive set of the microphones along the flight path during the flight of the aircraft using the flight path over the location. This second set of the sequential maximum sound pressure levels are sequential maximum sound pressure levels that have not yet been recorded at the time of the request in operation 1400. The deep learning models are used to generate a response that can be used to take one or more actions before the aircraft generates the second set of the sequential maximum sound pressure levels.

The speed at which the prediction is made is fast enough to allow a corrective action to be taken with respect to the aircraft in case the second set of the sequential maximum sound pressure levels will be greater than a threshold for sequential maximum sound pressure levels. This speed of prediction is faster than can be performed by human operators. The real time prediction allows for a practical application of the prediction to reduce noise.

Figure 15:
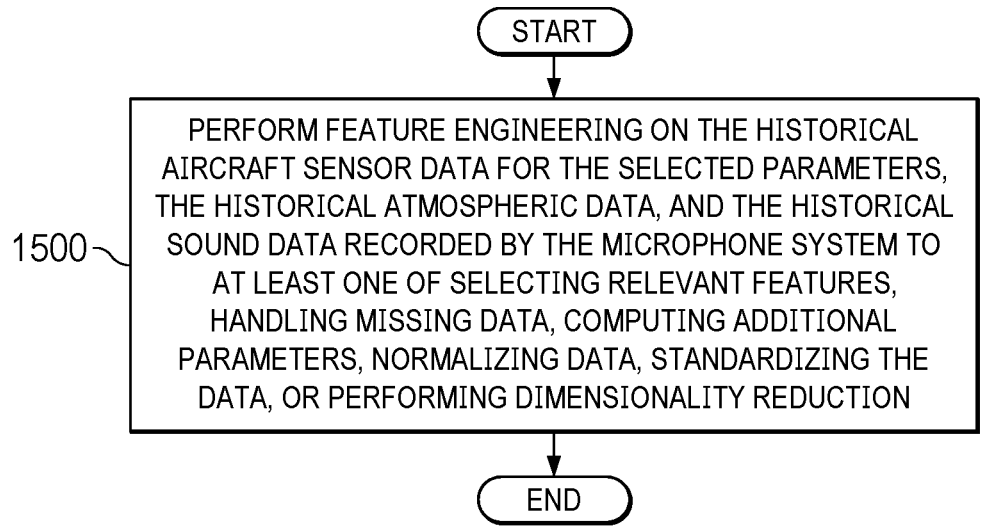
FIG. 15 is an illustration of a flowchart of a process for performing feature engineering on historical sensor data in accordance with an illustrative embodiment.

With reference now to FIG. 15, an illustration of a flowchart of a process for performing feature engineering on historical sensor data is depicted in accordance with an illustrative embodiment. The operations in this figure are examples of an additional operation that can be used within the operations in the process in FIG. 12.

The process performs feature engineering on: the historical aircraft sensor data for the selected parameters, the historical atmospheric data, and the historical sound data recorded by the microphone system. that may include at least one of: selecting relevant features, handling missing data, computing additional parameters, normalizing data, standardizing the data, or performing dimensionality reduction (operation 1500). The process terminates thereafter.

Figure 16:
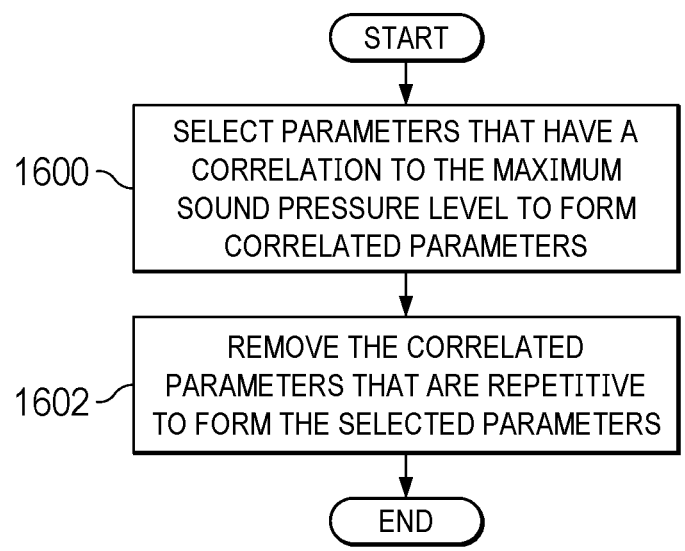
FIG. 16 is an illustration a flowchart of a process for selecting parameters to form correlated parameters in accordance with an illustrative embodiment.

With reference now to FIG. 16, an illustration a flowchart of a process for selecting parameters is depicted in accordance with an illustrative embodiment. The operations in this figure are examples of additional operations that can be used within the operations in the process in FIG. 12.

The process selects parameters that have a correlation to the maximum sound pressure level to form correlated parameters (operation 1600). The process removes the correlated parameters that are repetitive to form the selected parameters (operation 1602). The process terminates thereafter.

Figure 17:
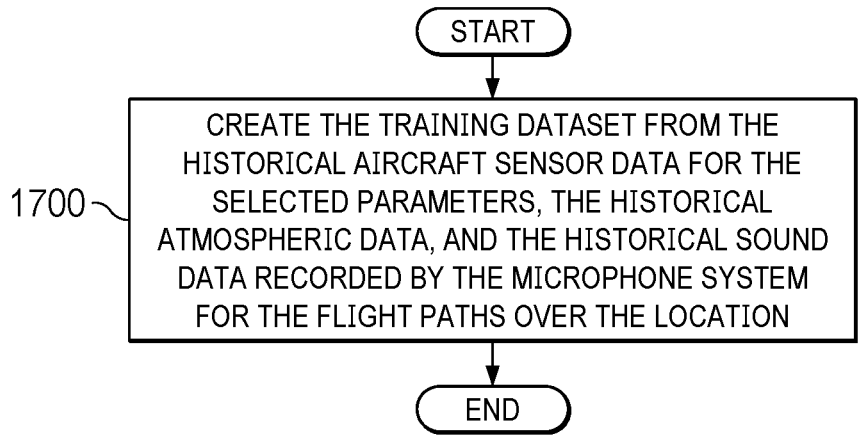
FIG. 17 is an illustration a flowchart of a process for creating a training dataset from sensor data in accordance with an illustrative embodiment.

With reference now to FIG. 17, an illustration a flowchart of a process for creating a training dataset from sensor data is depicted in accordance with an illustrative embodiment. The operations in this figure are examples of an operation that can be used within the operations in the process in FIG. 12.

The process creates the training dataset from the historical aircraft sensor data for the selected parameters, the historical atmospheric data, and the historical sound data recorded by the microphone system for the flight paths over the location (operation 1700). The process terminates thereafter.

In this example, the training dataset comprises groups of data. Each group of data in the groups of data is for a flight in the flights and includes the maximum sound pressure levels detected by microphones in the microphone system and the selected parameters corresponding to the time instances for the maximum sound pressure levels for the flight. The maximum sound pressure levels can be used as labels for the selected parameters and the historical atmospheric data.

Figure 18:
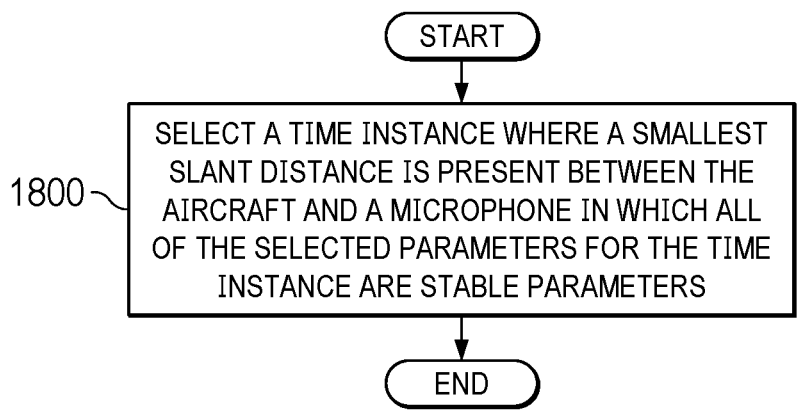
FIG. 18 is an illustration a flowchart of a process for selecting a time instance in accordance with an illustrative embodiment.

With reference now to FIG. 18, an illustration a flowchart of a process for selecting a time instance is depicted in accordance with an illustrative embodiment. The process in FIG. 18 is an example of one implementation for operation 1700 in FIG. 17.

The process selects a time instance where a smallest slant distance is present between the aircraft and a microphone in which all of the selected parameters for the time instance are stable parameters (operation 1800). The process terminates thereafter.

Figure 19:
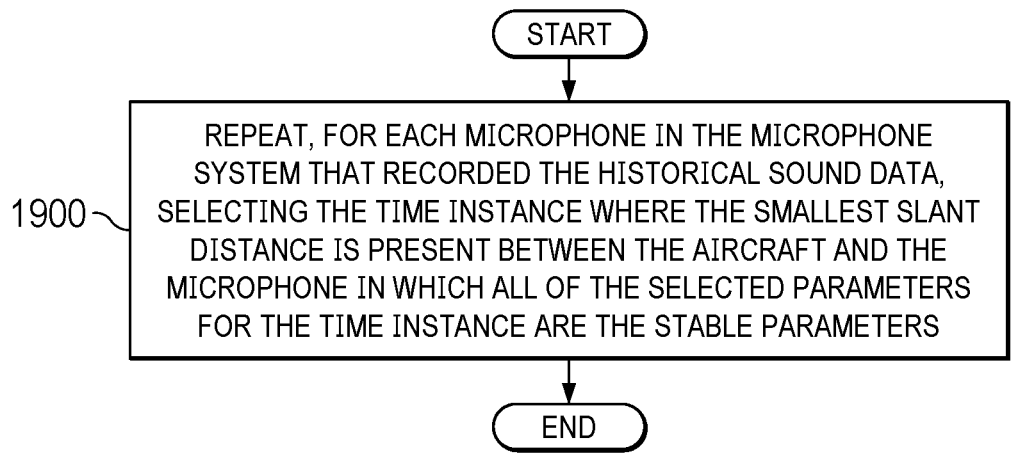
FIG. 19 is an illustration a flowchart of a process for selecting additional time instances in accordance with an illustrative embodiment.

With reference now to FIG. 19, an illustration a flowchart of a process for selecting additional time instances is depicted in accordance with an illustrative embodiment. The operations in this figure are examples of additional operations that can be used within the operations in the process in FIG. 18.

The process repeats, for each microphone in the microphone system that recorded the historical sound data, selecting the time instance where the smallest slant distance is preset between the aircraft and the microphone in which all of the selected parameters for the time instance are stable parameters (operation 1900). The process terminates thereafter.

Figure 20:
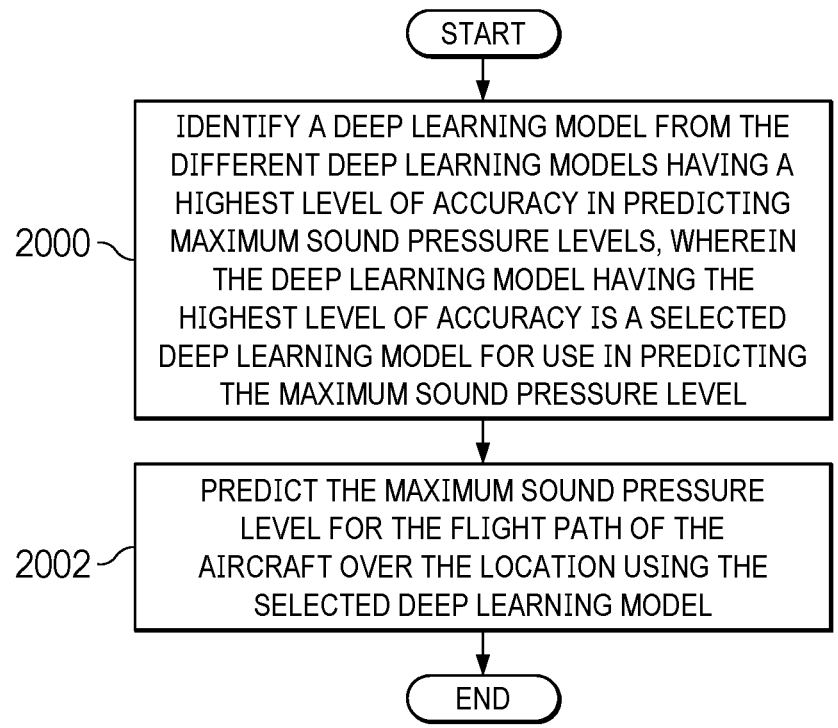
FIG. 20 is an illustration of a flowchart of a process for identifying a deep learning model in accordance with an illustrative embodiment.

With reference now to FIG. 20, an illustration of a flowchart of a process for identifying a deep learning model is depicted in accordance with an illustrative embodiment. The operations in this figure are examples of additional operations that can be used within the operations in the process in FIG. 12.

The process identifies a deep learning model from the different deep learning models having a highest level of accuracy in predicting maximum sound pressure levels, wherein a deep learning model having the highest level of accuracy is a selected deep learning model for use in predicting the maximum sound pressure level (operation 2000). The process predicts the maximum sound pressure level for the flight path of the aircraft over the location using the selected deep learning model (operation 2002). Operation 2002 is an example of an implementation of operation 1204 in FIG. 12. The process terminates thereafter.

Figure 21:
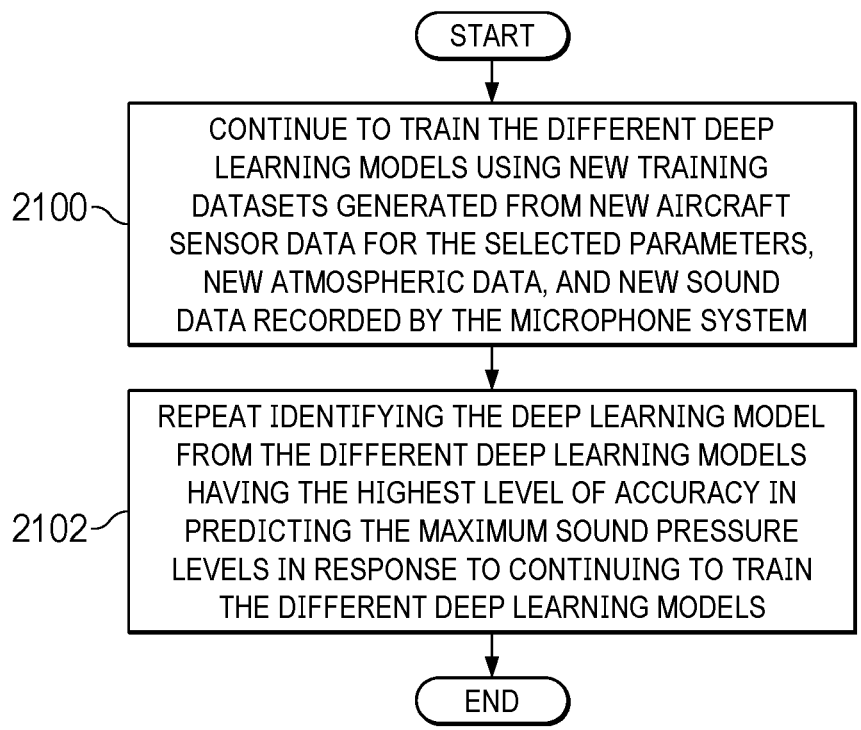
FIG. 21 is an illustration of a flowchart of a process for continuing to train different deep learning models in accordance with an illustrative embodiment.

With reference now to FIG. 21, an illustration of a flowchart of a process for continuing to train different deep learning models is depicted in accordance with an illustrative embodiment. The operations in this figure are examples of additional operations that can be used within the operations in the process in FIG. 20.

The process continues to train the different deep learning models using new training datasets generated from new aircraft sensor data for the selected parameters, new atmospheric data, and new sound data recorded by the microphone system (operation 2100). The process repeats identifying the deep learning model from the different deep learning models having the highest level of accuracy in predicting the maximum sound pressure levels in response to continuing to train the different deep learning models (operation 2102). The process terminates thereafter.

Figure 22:
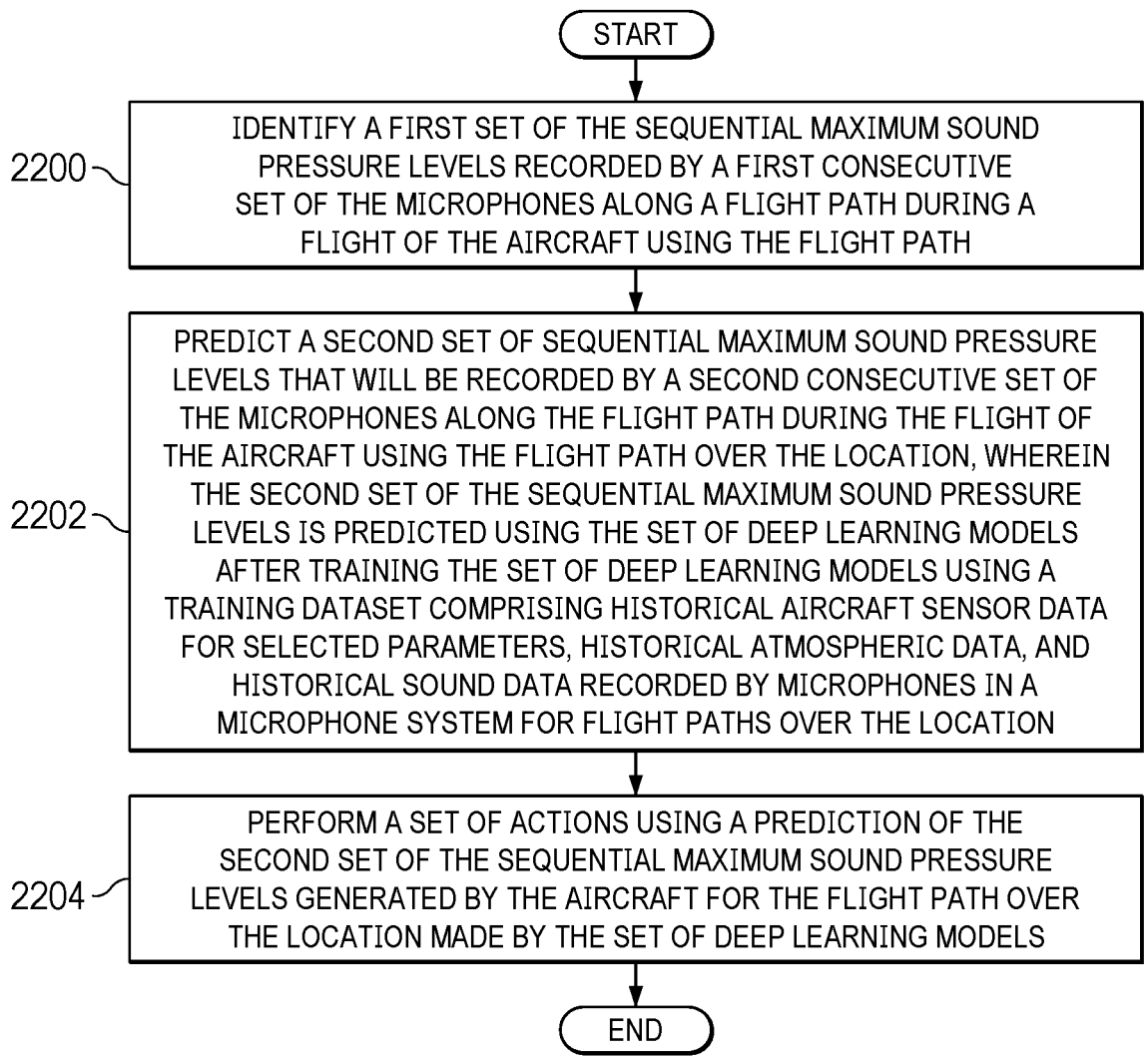
FIG. 22 is an illustration of a flowchart of a process for predicting sequential maximum sound pressure levels generated by an aircraft in accordance with an illustrative embodiment.

With reference to FIG. 22, an illustration of a flowchart of a process for predicting sequential maximum sound pressure levels generated by an aircraft is depicted in accordance with an illustrative embodiment. The process illustrated in FIG. 22 can be implemented using computer system 212 and controller 214 in FIG. 2. For example, the process can be implemented in controller 214 in computer system 212 in FIG. 2.

The process begins by identifying a first set of sequential maximum sound pressure levels recorded by a first consecutive set of the microphones along a flight path during a flight of the aircraft using the flight path (operation 2200). The process predicts a second set of sequential maximum sound pressure levels that will be recorded by a second consecutive set of the microphones along the flight path during the flight of the aircraft using the flight path over the location, wherein the second set of sequential maximum sound pressure levels is predicted using the set of deep learning models after training the set of deep learning models using a training dataset comprising historical aircraft sensor data for selected parameters, historical atmospheric data, and historical sound data recorded by microphones in a microphone system for flight paths over the location (operation 2202).

The process performs a set of actions using a prediction of the second set of the sequential maximum sound pressure levels generated by the aircraft for the flight path over the location made by the set of deep learning models (operation 2204). The process terminates thereafter. In operation 2204, wherein the set of actions is selected from at least one of planning a future flight path over the location using the prediction of the second set of the sequential maximum sound pressure levels generated by the aircraft for the flight path over the location, determining compliance with a regulation regarding the maximum sound pressure levels for the location, changing a future portion of the flight path, or changing an aircraft configuration for the aircraft for the future portion of the flight path.

Figure 23:
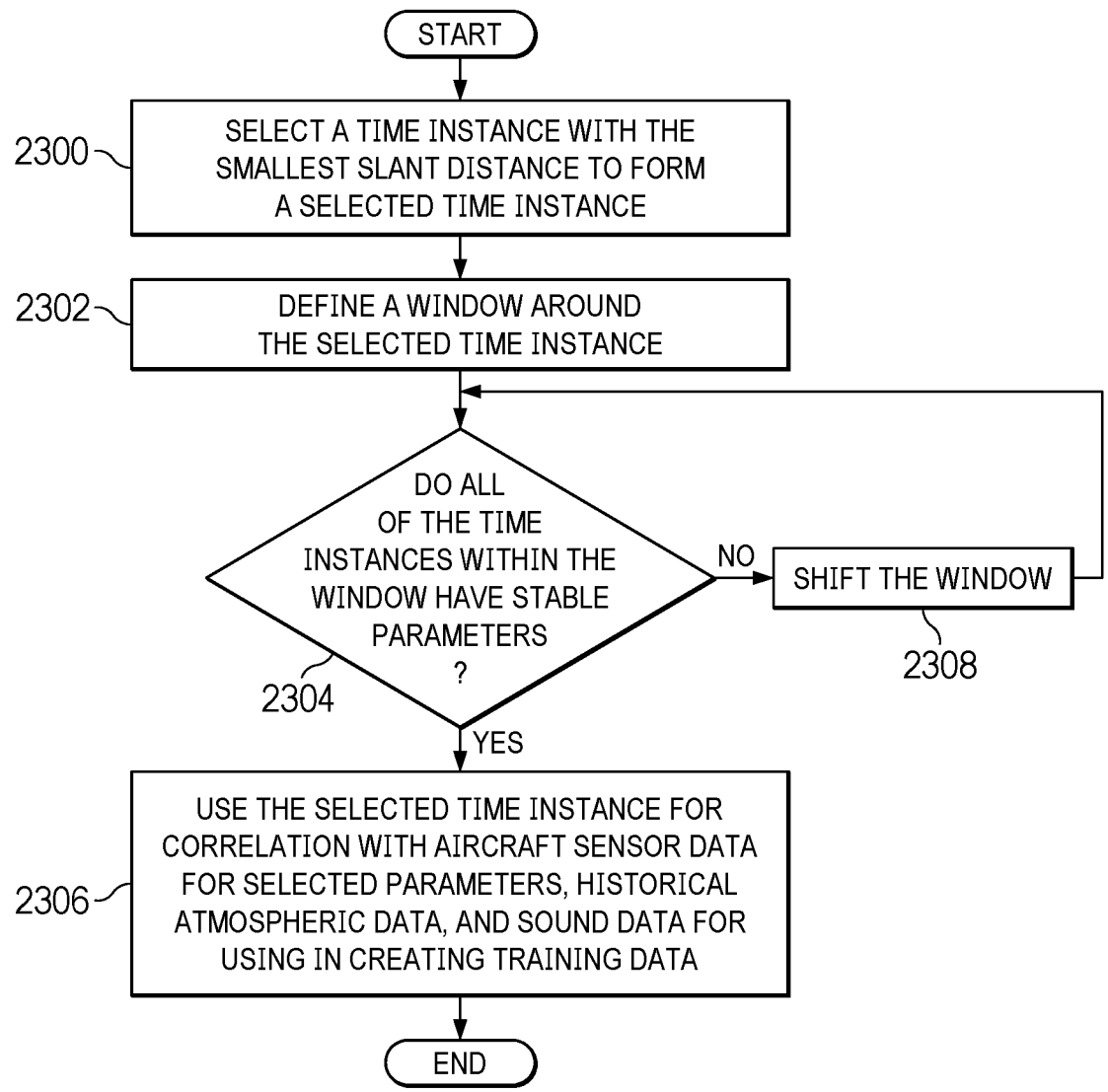
FIG. 23 an illustration of a flowchart of a process for identifying time instances for training data in accordance with an illustrative embodiment.

With reference to FIG. 23, an illustration of a flowchart of a process for identifying time instances for training data is depicted in accordance with an illustrative embodiment. The process illustrated in FIG. 23 is an example of one implementation for operation 1800 in FIG. 18.

The process begins by selecting a time instance with a smallest slant distance to form a selected time instance (operation 2300). The process defines a window around the selected time instance (operation 2302). In operation 2302, selected time instance is in the center of the window or as close to the center as possible. The size of the time window can be a default or preselected size such as 3, 5, or 7 time instances wide. Although odd numbered time instances are shown, other examples can use windows with even numbered instances.

The process then determines whether all of the time instances within the window have stable parameters (operation 2304). If all of the time instances within window have stable parameters, the process uses the selected time instance for correlation with aircraft sensor data for selected parameters, historical atmospheric data, and sound data for using in creating training data (operation 2306). The process terminates thereafter. The selected time instance in operation 2306 is for a single flight. In operation 2306, this data can be associated with a label that is the maximum pressure level value.

With reference again to operation 2304, if the smallest slant distance where stable parameters are present is not less than the threshold, the process shifts the window (operation 2308) the process then returns to operation 2304. The window can be shifted in either direction. In operation 2308, the window can also be changed in size.

The flowcharts and block diagrams in the different depicted embodiments illustrate the architecture, functionality, and operation of some possible implementations of apparatuses and methods in an illustrative embodiment. In this regard, each block in the flowcharts or block diagrams can represent at least one of a module, a segment, a function, or a portion of an operation or step. For example, one or more of the blocks can be implemented as program code, hardware, or a combination of the program code and hardware. When implemented in hardware, the hardware can, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams can be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 24:
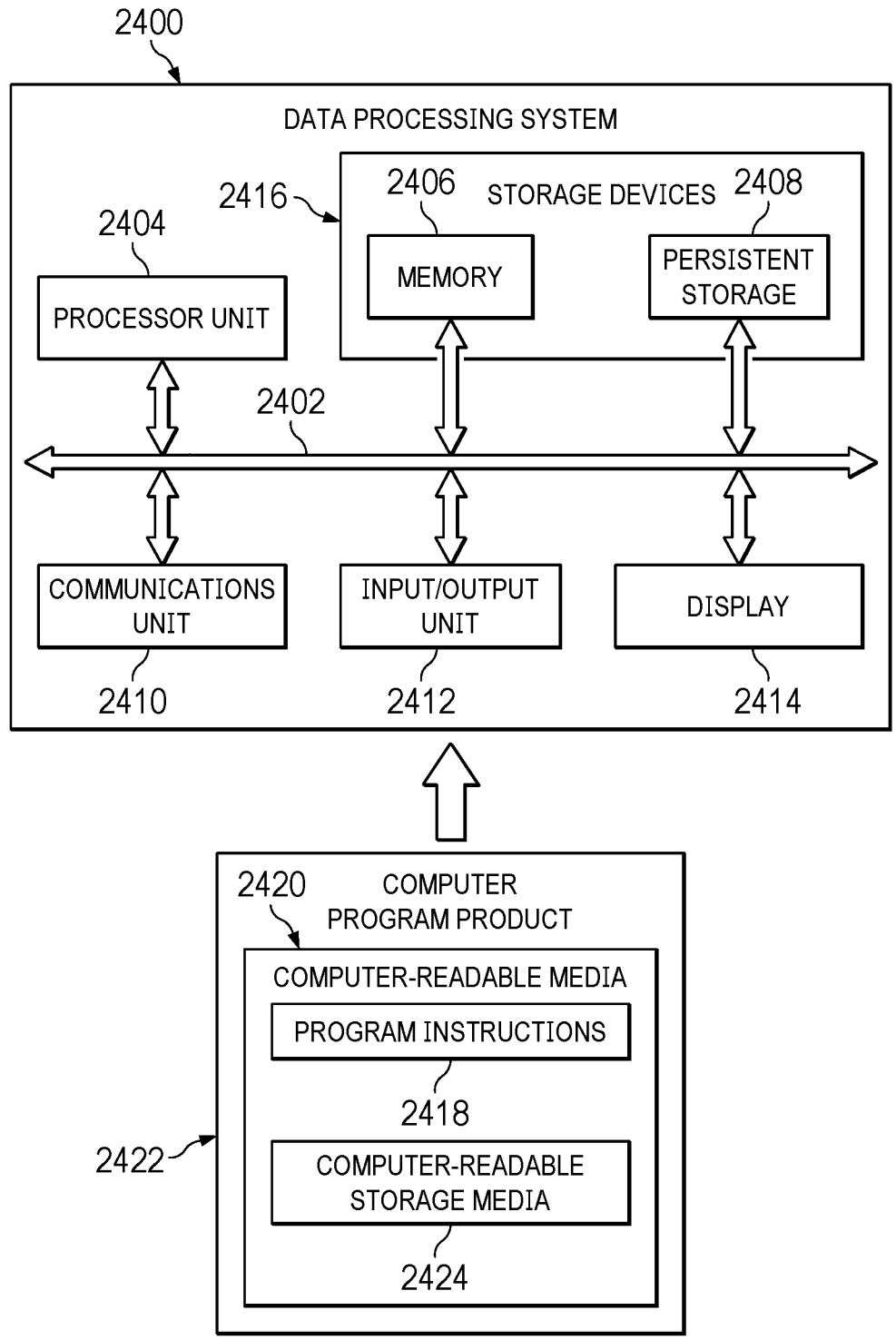
FIG. 24 is an illustration of a block diagram of a data processing system in accordance with an illustrative embodiment.

Turning now to FIG. 24, an illustration of a block diagram of a data processing system is depicted in accordance with an illustrative embodiment. Data processing system 2400 can be used to implement server computer 104, server computer 106, client devices 110, in FIG. 1. Data processing system 2400 can also be used to implement computer system 212 in FIG. 2. In this illustrative example, data processing system 2400 includes communications framework 2402, which provides communications between processor unit 2404, memory 2406, persistent storage 2408, communications unit 2410, input/output (I/O) unit 2412, and display 2414. In this example, communications framework 2402 takes the form of a bus system.

Processor unit 2404 serves to execute instructions for software that can be loaded into memory 2406. Processor unit 2404 includes one or more processors. For example, processor unit 2404 can be selected from at least one of a multicore processor, a central processing unit (CPU), a graphics processing unit (GPU), a physics processing unit (PPU), a digital signal processor (DSP), a network processor, or some other suitable type of processor. Further, processor unit 2404 can may be implemented using one or more heterogeneous processor systems in which a main processor is present with secondary processors on a single chip. As another illustrative example, processor unit 2404 can be a symmetric multi-processor system containing multiple processors of the same type on a single chip.

Memory 2406 and persistent storage 2408 are examples of storage devices 2416. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 2416 may also be referred to as computer-readable storage devices in these illustrative examples. Memory 2406, in these examples, can be, for example, a random-access memory or any other suitable volatile or non-volatile storage device. Persistent storage 2408 can take various forms, depending on the particular implementation.

For example, persistent storage 2408 may contain one or more components or devices. For example, persistent storage 2408 can be a hard drive, a solid-state drive (SSD), a flash memory, a rewritable optical disk, a rewritable magnetic tape, or some combination of the above. The media used by persistent storage 2408 also can be removable. For example, a removable hard drive can be used for persistent storage 2408.

Communications unit 2410, in these illustrative examples, provides for communications with other data processing systems or devices. In these illustrative examples, communications unit 2410 is a network interface card.

Input/output unit 2412 allows for input and output of data with other devices that can be connected to data processing system 2400. For example, input/output unit 2412 can provide a connection for user input through at least one of a keyboard, a mouse, or some other suitable input device. Further, input/output unit 2412 can send output to a printer. Display 2414 provides a mechanism to display information to a user.

Instructions for at least one of the operating system, applications, or programs can be located in storage devices 2416, which are in communication with processor unit 2404 through communications framework 2402. The processes of the different embodiments can be performed by processor unit 2404 using computer-implemented instructions, which can be located in a memory, such as memory 2406.

These instructions are program instructions and are also referred to as program code, computer usable program code, or computer-readable program code that can be read and executed by a processor in processor unit 2404. The program instructions in the different embodiments can be embodied on different physical or computer-readable storage media, such as memory 2406 or persistent storage 2408.

Program instructions 2418 are located in a functional form on computer-readable media 2420 that is selectively removable and can be loaded onto or transferred to data processing system 2400 for execution by processor unit 2404. Program instructions 2418 and computer-readable media 2420 form computer program product 2422 in these illustrative examples. In the illustrative example, computer-readable media 2420 is computer-readable storage media 2424.

Computer-readable storage media 2424 is a physical or tangible storage device used to store program instructions 2418 rather than a media that propagates or transmits program instructions 2418. Computer readable storage media 2424, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Alternatively, program instructions 2418 can be transferred to data processing system 2400 using a computer-readable signal media. The computer-readable signal media are signals and can be, for example, a propagated data signal containing program instructions 2418. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

Further, as used herein, "computer-readable media 2420" can be singular or plural. For example, program instructions 2418 can be located in computer-readable media 2420 in the form of a single storage device or system. In another example, program instructions 2418 can be located in computer-readable media 2420 that is distributed in multiple data processing systems. In other words, some instructions in program instructions 2418 can be located in one data processing system while other instructions in program instructions 2418 can be located in one data processing system. For example, a portion of program instructions 2418 can be located in computer-readable media 2420 in a server computer while another portion of program instructions 2418 can be located in computer-readable media 2420 located in a set of client computers.

The different components illustrated for data processing system 2400 are not meant to provide architectural limitations to the manner in which different embodiments can be implemented. In some illustrative examples, one or more of the components may be incorporated in or otherwise form a portion of, another component. For example, memory 2406, or portions thereof, can be incorporated in processor unit 2404 in some illustrative examples. The different illustrative embodiments can be implemented in a data processing system including components in addition to or in place of those illustrated for data processing system 2400. Other components shown in FIG. 24 can be varied from the illustrative examples shown. The different embodiments can be implemented using any hardware device or system capable of running program instructions 2418.

Some features of the illustrative examples are described in the following clauses. These clauses are examples of features not intended to limit other illustrative examples.

Clause 1

A method for predicting sequential maximum sound pressure levels generated by an aircraft, the method comprising:

training a set of deep learning models to predict the sequential maximum sound pressure levels generated by the aircraft for a flight path over a location using a training dataset comprising historical aircraft sensor data for selected parameters, historical atmospheric data, and historical sound data recorded by microphones in a microphone system for flight paths over the location;

identifying a first set of the sequential maximum sound pressure levels recorded by a first consecutive set of the microphones along the flight path during a flight of the aircraft using the flight path; and predicting a second set of the sequential maximum sound pressure levels that will be recorded by a second consecutive set of the microphones along the flight path during the flight of the aircraft using the flight path over the location, wherein the second set of the sequential maximum sound pressure levels is predicted using the set of deep learning models after training the set of deep learning models using the training dataset.

Clause 2

The method according to clause 1 further comprising:

adjusting a set of weights in the set of deep learning models using errors using backward propagation to reduce error between an actual output of a layer in a deep learning model from forward propagation and a desired output for the layer in the deep learning model.

Clause 3

The method according to clause 2, wherein each selected parameter in the selected parameters is assigned a different weight from other selected parameters in the deep learning model in the set of deep learning models Clause 4

The method according to one of clauses 1, 2, or 3, wherein the set of deep learning models uses autoregression for time series forecasting, wherein the first set of the sequential maximum sound pressure levels recorded by the first consecutive set of the microphones is a function of prior sequential time steps input into the set of deep learning models and the set of deep learning models outputs the second set of the sequential maximum sound pressure levels as a function of subsequent sequential time steps.

Clause 5

The method according to one of clauses 1, 2, 3, or 4, wherein the first consecutive set of the microphones is different from the second consecutive set of the microphones.

Clause 6

The method according to one of clauses 1, 2, 3, 4, or 5, wherein the set of deep learning models is selected from at least one of an encoder-decoder long short-term memory model, a convolutional neural network long short-term memory encoder-decoder model, or a convolutional long short-term memory encoder-decoder model.

Clause 7

The method according to one of clauses 1, 2, 3, 4, 5, or 6, wherein the set of deep learning models are located in a cloud computing environment.

Clause 8

The method according to clause 7 further comprising:
receiving, by a microservice in the cloud computing environment, a request to predict the sequential maximum sound pressure levels that will be generated by the aircraft for the flight path over the location using the set of deep learning models as the aircraft flies using the flight path.

Clause 9

The method according to one of clauses 1, 2, 3, 4, 5, 6, 7, or 8, wherein a deep learning model in the set of deep learning models comprises an input layer, a set of hidden layers, and an output layer, wherein the input layer receives a first number of time steps and the output layer outputs a second number of time steps.

Clause 10

The method according to one of clauses 1, 2, 3, 4, 5, 6, 7, 8, or 9, wherein the set of deep learning models comprises different deep learning models and further comprising:
identifying a deep learning model from the different deep learning models having a highest level of accuracy in predicting maximum sound pressure levels, wherein the deep learning model having the highest level of accuracy is a selected deep learning model for use in predicting the sequential maximum sound pressure levels; and
wherein predicting the second set of the sequential maximum sound pressure levels that will be recorded by the second consecutive set of the microphones along the flight path during the flight of the aircraft using the flight path over the location comprises:
predicting the second set of the sequential maximum sound pressure levels that will be recorded by the second consecutive set of the microphones along the flight path during the flight of the aircraft using the flight path over the location, wherein the second set of the sequential maximum sound pressure levels is predicted using the selected deep learning model.

Clause 11

The method according to one of clauses 1, 2, 3, 4, 5, 6, 7, 8, 9, or 10, wherein the flight path is for one of a departing flight from an airport and an arriving flight to the airport.

Clause 12

A method for predicting sequential maximum sound pressure levels generated by an aircraft, the method comprising:
identifying a first set of the sequential maximum sound pressure levels recorded by a first consecutive set of microphones along a flight path during a flight of the aircraft using the flight path; and
predicting a second set of the sequential maximum sound pressure levels that will be recorded by a second consecutive set of the microphones along the flight path during the flight of the aircraft using the flight path over a location, wherein the second set of the sequential maximum sound pressure levels is predicted using a set of deep learning models after training the set of deep learning models using a training dataset comprising historical aircraft sensor data for selected parameters, historical atmospheric data, and historical sound data recorded by the microphones in a microphone system for flight paths over the location.

Clause 13

The method according to clause 12 further comprising:
performing a set of actions using a prediction of the second set of the sequential maximum sound pressure levels generated by the aircraft for the flight path over the location made by the set of deep learning models.

Clause 14

The method according to clause 13, wherein the set of actions is selected from at least one of planning a future flight path over the location using the prediction of the second set of the sequential maximum sound pressure levels generated by the aircraft for the flight path over the location, determining compliance with a regulation regarding maximum sound pressure levels for the location, changing a future portion of the flight path, or changing an aircraft configuration for the aircraft for the future portion of the flight path.

Clause 15

A deep learning system for sequential sound pressure level prediction comprising:
a computer system; and
a controller in the computer system, wherein controller is configured to:
train a set of deep learning models to predict sequential maximum sound pressure levels generated by an aircraft for a flight path over a location using a training dataset comprising historical aircraft sensor data for selected parameters, historical atmospheric data, and historical sound data recorded by microphones in a microphone system for flight paths over the location;
identify a first set of the sequential maximum sound pressure levels recorded by a first consecutive set of the microphones along the flight path during a flight of the aircraft using the flight path; and
predict a second set of the sequential maximum sound pressure levels that will be recorded by a second consecutive set of the microphones along the flight path during the flight of the aircraft using the flight path over the location, wherein the second set of the sequential maximum sound pressure levels is predicted using the set of deep learning models after training the set of deep learning models using the training dataset.

Clause 16

The deep learning system according to clause 15, wherein the controller is configured to:
adjust a set of weights in the set of deep learning models using errors using backward propagation to reduce error between an actual output of a layer in a deep learning model from forward propagation and a desired output for the layer in the deep learning model.

Clause 17

The deep learning system according to clause 16, wherein each selected parameter in the selected parameters is assigned a different weight from other selected parameters in the deep learning model in the set of deep learning models.

Clause 18
The deep learning system according to one of clauses 15, 16, or 17, wherein the set of deep learning models uses autoregression for time series forecasting, wherein a first number of the sequential maximum sound pressure levels recorded by the first number of the microphones is a function of prior sequential time steps input into the set of deep learning models and the set of deep learning models outputs the second set of the sequential maximum sound pressure levels as a function of subsequent sequential time steps.

Clause 19
The deep learning system according to one of clauses 15, 16, 17, or 18, wherein a first number of the first consecutive set of the microphones is different from a second number of the second consecutive set of the microphones.

Clause 20
The deep learning system according to one of clauses 15, 16, 17, 18, or 19, wherein the set of deep learning models is selected from at least one of an encoder-decoder long short-term memory model, a convolutional neural network long short-term memory encoder-decoder model, or a convolutional long short-term memory encoder-decoder model.

Clause 21
The deep learning system according to one of clauses 15, 16, 17, 18, 19, or 20, wherein the set of deep learning models are located in a cloud computing environment.

Clause 22
The deep learning system according to clause 21, wherein the controller is configured to:
receive, by a microservice in the cloud computing environment, a request to predict the sequential maximum sound pressure levels generated by the aircraft for the flight path over the location using the set of deep learning models.

Clause 23
The deep learning system according to one of clauses 15, 16, 17, 18, 19, 20, 21, or 22, wherein a deep learning model in the set of deep learning models comprises an input layer, a set of hidden layers, and an output layer, wherein the input layer receives a first number of time steps and the output layer outputs a second number of the time steps.

Clause 24
The deep learning system according to one of clauses 15, 16, 17, 18, 19, 20, 21, 21, or 23, wherein the set of deep learning models comprises different deep learning models and, wherein the controller is configured to:
identify a deep learning model from the different deep learning models having a highest level of accuracy in predicting maximum sound pressure levels, wherein the deep learning model having the highest level of accuracy is a selected deep learning model for use in predicting the sequential maximum sound pressure levels; and
wherein in predicting the second set of the sequential maximum sound pressure levels that will be recorded by the second consecutive set of the microphones during the flight of the aircraft using the flight path over the location, the controller is configured to:
predict the second set of the sequential maximum sound pressure levels that will be recorded by the second consecutive set of the microphones along the flight path during the flight of the aircraft using the flight path over the location, wherein the second set of the sequential maximum sound pressure levels is predicted using the selected deep learning model.

Clause 25
The deep learning system according to one of clauses 15, 16, 17, 18, 19, 20, 21, 22, 23, or 24, wherein the flight path is for one of a departing flight from an airport and an arriving flight to the airport.

Clause 26
A computer program product for predicting sequential maximum sound pressure levels, the computer program product comprising a computer readable storage medium having program instructions embodied therewith, the program instructions executable by a computer system to cause the computer system to perform a method of:
training a set of deep learning models to predict the sequential maximum sound pressure levels generated by an aircraft for a flight path over a location using a training dataset comprising historical aircraft sensor data for selected parameters, historical atmospheric data, and historical sound data recorded by microphones in a microphone system for flight paths over the location;
recording a first set of the sequential maximum sound pressure levels recorded by a first consecutive set of the microphones along the flight path during a flight of the aircraft using the flight path; and
predicting a second set of the sequential maximum sound pressure levels that will be recorded by a second consecutive set of the microphones along the flight path during the flight of the aircraft using the flight path over the location, wherein the second set of the sequential maximum sound pressure levels is predicted using the set of deep learning models after training the set of deep learning models using the training dataset.

Thus, illustrative examples provide a method, apparatus, system, and computer program product for predicting noise in the form of maximum sound pressure levels. The prediction of maximum sound pressure levels is performed using a deep learning model that has been trained using historical aircraft sensor data for selected parameters, historical atmospheric data, and historical sound data reported by microphone system for flight paths over a location. In these illustrative examples, a prediction of a maximum sound pressure level can be made for a flight path over the location.

With these predictions of sequential sound pressure level has increased accuracy. Airlines can use these predictions to plan flight paths that reduce undesired noise in areas near an airport. Further, airports and regulators can more easily enforce noise-reduced arrival and departure procedures and penalizing airlines for their flights that produce noise above mandated thresholds for maximum sound pressure levels. With more accurate predictions using deep learning models, meeting thresholds for noise levels can occur more easily for airlines.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, To the extent that terms "includes", "including", "has", "contains", and variants thereof are used herein, such terms are intended to be inclusive in a manner similar to the term "comprises" as an open transition word without precluding any additional or other elements.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for predicting sequential maximum sound pressure levels generated by an aircraft during a second portion of a flight of the aircraft, the method comprising a controller, in real time during the flight:
   receiving, during a first portion of the flight, continuous parameter logging data from sensors comprising noise sensors;
   feature engineering the continuous parameter logging data into selected parameters comprising stable parameters within a time instance comprising a smallest slant distance between the aircraft and a noise sensor in the noise sensors;
   transforming the selected parameters into a training dataset for a deep learning model;
   training, using the training dataset, the deep learning model for predicting sequential LAmax sound pressure levels generated by the aircraft over the second portion of the flight;
   identifying a first set of the sequential maximum sound pressure levels recorded by a first consecutive set of microphones in the noise sensors along a first portion of the flight of the aircraft; and
   subsequently, using the deep learning model, predicting, with a mean error of less than 2 dBA with a standard deviation of 0.2 dBA, a second set of the sequential LAmax sound pressure levels that will be recorded by a second consecutive set of the microphones in the noise sensors along the second portion of the flight.

2. The method of claim 1, further comprising:
   locating the controller on the aircraft; and
   adjusting a set of weights in the deep learning model using errors using backward propagation to reduce error between an actual output of a layer in the deep learning model from forward propagation and a desired output for the layer in the deep learning model.

3. The method of claim 2, further comprising:
   using unsupervised training for training the deep learning model; and
   assigning each selected parameter in the selected parameters a different weight from other selected parameters in the deep learning model.

4. The method of claim 1, wherein the deep learning model uses autoregression for time series forecasting, wherein the first set of the sequential LAmax sound pressure levels recorded by the first consecutive set of the microphones is a function of prior sequential time steps input into the deep learning model and the deep learning model outputs the second set of the sequential LAmax sound pressure levels as a function of subsequent sequential time steps.

5. The method of claim 1, further comprising:
   implementing the controller in a microservice; and
   the first consecutive set of the microphones differing from the second consecutive set of the microphones.

6. The method of claim 1, wherein the deep learning model is selected from at least one of: an encoder-decoder long short-term memory model, a convolutional neural network long short-term memory encoder-decoder model, or a convolutional long short-term memory encoder-decoder model.

7. The method of claim 1, further comprising:
   processing the continuous parameter logging data by at least one of: imputing values for missing parameters, computing additional parameters, standardizing data, or performing dimensionality reduction on repetitive parameters; and
   locating the deep learning model in a cloud computing environment.

8. The method of claim 7 further comprising:
   receiving, by a microservice in the cloud computing environment, a request to predict the sequential LAmax sound pressure levels that will be generated by the aircraft during the flight.

9. The method of claim 1, further comprising:
   the deep learning model comprising: an input layer, a set of hidden layers, and an output layer; and
   the input layer receiving a first number of time steps and the output layer outputs a second number of time steps.

10. The method of claim 1, further comprising a set of deep learning models comprising different deep learning models and further comprising:
    identifying a deep learning model from the different deep learning models having a highest level of accuracy in predicting LAmax sound pressure levels, wherein the deep learning model having the highest level of accuracy is a selected deep learning model for use in predicting the sequential LAmax sound pressure levels; and
    wherein predicting the second set of the sequential LAmax sound pressure levels that will be recorded by the second consecutive set of the microphones during the flight of the aircraft:
    predicting the second set of the sequential LAmax sound pressure levels that will be recorded by the second consecutive set of the microphones along the second portion of the flight, wherein the second set of the sequential LAmax sound pressure levels is predicted using the deep learning model.

11. The method of claim 1, wherein the flight is one of: a departing flight from an airport or an arriving flight to the airport.

12. A method for predicting sequential LAmax sound pressure levels generated by an aircraft, the method comprising:
    receiving, during a first portion of a flight by the aircraft, continuous parameter logging data from sensors comprising noise sensors including a first set of the sequential LAmax sound pressure levels recorded by a first consecutive set of microphones in the noise sensors along a flight path during the first portion of the flight;
    feature engineering, in real time in a controller on the aircraft, the continuous parameter logging data into selected parameters comprising stable parameters within a time instance comprising a smallest slant distance between the aircraft and a noise sensor in the noise sensors;
    transforming, in real time in a controller on the aircraft, the selected parameters into a training dataset for a deep learning model;
    training, using the training dataset in real time in a controller on the aircraft, the deep learning model for predicting sequential LAmax sound pressure levels generated by the aircraft over a second portion of the flight; and subsequently, using the deep learning model, in real time in a controller on the aircraft, predicting, with a mean error of less than 2 dBA with a standard deviation of 0.2 dBA, a second set of the sequential LAmax sound pressure levels that will be recorded by a second consecutive set of the microphones in the noise sensors along the second portion of the flight path during the flight of the aircraft.

13. The method of claim 12, further comprising performing a set of actions using a prediction of the second set of the sequential LAmax sound pressure levels.

14. The method of claim 13, further comprising selecting the set of actions from at least one of planning a future flight path using the prediction of the second set of the sequential LAmax sound pressure levels, determining compliance with a regulation regarding LAmax sound pressure levels for the, changing a future portion of the flight, or changing an aircraft configuration for the aircraft for the future portion of the flight.

15. A deep learning system that comprises a computer system that comprises a controller configured to in real time:
receive, in a first portion of a flight by an aircraft, continuous parameter logging data from at least: aircraft, environmental, and noise, sensors including a first set of sequential LAmax sound pressure levels recorded by a first consecutive set of microphones in the noise sensors along a flight path during a first portion of a flight of the aircraft;
reduce the continuous parameter logging data into selected parameters comprising stable parameters within a time instance comprising a smallest slant distance between the aircraft and a noise sensor in the noise sensors;
transform the selected parameters into a training dataset for a set of deep learning models;
train the set of deep learning models to predict sequential LAmax sound pressure levels generated by the aircraft on a second portion of the flight; and
predict, with a mean error of less than 2 dBA with a standard deviation of 0.2 dBA, a second set of the sequential LAmax sound pressure levels that will be recorded by a second consecutive set of the microphones along the flight path during the flight of the aircraft, wherein the second set of the sequential LAmax sound pressure levels is predicted using the set of deep learning models after training the set of deep learning models using the training dataset.

16. The deep learning system of claim 15, wherein the controller is further configured to adjust a set of weights in the set of deep learning models using errors using backward propagation to reduce error between an actual output of a layer in a deep learning model from forward propagation and a desired output for the layer in the deep learning model.

17. The deep learning system of claim 16, wherein each selected parameter in the selected parameters is assigned a different weight from other selected parameters in the deep learning model in the set of deep learning models.

18. The deep learning system of claim 15, wherein the set of deep learning models uses autoregression for time series forecasting, wherein a first number of the sequential LAmax sound pressure levels recorded by the first number of the microphones is a function of prior sequential time steps input into the set of deep learning models and the set of deep learning models outputs the second set of the sequential LAmax sound pressure levels as a function of subsequent sequential time steps.

19. The deep learning system of claim 15, wherein a first number of the first consecutive set of the microphones is different from a second number of the second consecutive set of the microphones.

20. The deep learning system of claim 15, wherein the set of deep learning models is selected from at least one of an encoder-decoder long short-term memory model, a convolutional neural network long short-term memory encoder-decoder model, or a convolutional long short-term memory encoder-decoder model.

21. The deep learning system of claim 15, wherein the set of deep learning models are located in a cloud computing environment.

22. The deep learning system of claim 21, wherein the controller is configured to:
receive, by a microservice in the cloud computing environment, a request to predict the sequential LAmax sound pressure levels generated by the aircraft for the flight path over the location using the set of deep learning models.

23. The deep learning system of claim 15, wherein a deep learning model in the set of deep learning models comprises an input layer, a set of hidden layers, and an output layer, wherein the input layer receives a first number of time steps and the output layer outputs a second number of the time steps.

24. The deep learning system of claim 15, wherein the set of deep learning models comprises different deep learning models and, wherein the controller is further configured to:
identify a deep learning model from the different deep learning models having a prediction with a highest level of accuracy of LAmax sound pressure levels, and
predict the second set of the sequential LAmax sound pressure levels that will be recorded by the second consecutive set of the microphones along the second portion of the flight path during the flight of the aircraft, wherein the second set of the sequential LAmax sound pressure levels is predicted based upon the deep learning model.

25. The deep learning system of claim 15, wherein the flight is for one of a departing flight from an airport or an arriving flight to the airport.

26. A computer program product configured to predict in real time sequential LAmax sound pressure levels, wherein the computer program product comprising a computer readable storage medium that comprises program instructions embodied therewith, the program instructions configured for execution by a computer system to cause the computer system to:
receive, during a first portion of a flight of an aircraft, continuous parameter logging data from sensors that comprise noise sensors;
feature engineering the continuous parameter logging data into selected parameters comprising stable parameters within a time instance comprising a smallest slant distance between the aircraft and a noise sensor in the noise sensors;
transform the selected parameters into a training dataset for a deep learning model;
train, based upon the training dataset, a set of deep learning models to predict the sequential LAmax sound pressure levels generated by the aircraft on a second portion of the flight; and
predict, with a mean error of less than 2 dBA with a standard deviation of 0.2 dBA, a second set of the sequential LAmax sound pressure levels that will be recorded by a second consecutive set of noise sensors along the second portion of the flight during the flight of the aircraft, wherein a prediction of the second set of the sequential LAmax sound pressure levels is a product of the set of deep learning models trained with the training dataset.

\* \* \* \* \*